United States Patent [19]

Itonori et al.

[11] Patent Number: 5,943,443
[45] Date of Patent: Aug. 24, 1999

[54] METHOD AND APPARATUS FOR IMAGE BASED DOCUMENT PROCESSING

[75] Inventors: Katsuhiko Itonori; Masaharu Ozaki, both of Nakai-machi, Japan

[73] Assignee: Fuji Xerox Co., Ltd., Tokyo, Japan

[21] Appl. No.: 08/880,399

[22] Filed: Jun. 23, 1997

[30] Foreign Application Priority Data

Jun. 26, 1996 [JP] Japan .................................. 8-166147
Oct. 17, 1996 [JP] Japan .................................. 8-274732

[51] Int. Cl.⁶ .............................. G06K 9/62; G06K 9/72; G06K 9/54; G06K 9/60
[52] U.S. Cl. ......................... 382/225; 382/229; 382/306; 358/403; 707/5; 707/6
[58] Field of Search .................................. 382/224, 225, 382/226, 227, 228, 229, 230, 231, 305, 306, 177, 176, 185; 358/403; 707/2, 4, 5, 6

[56] References Cited

U.S. PATENT DOCUMENTS

| | | | |
|---|---|---|---|
| 5,029,084 | 7/1991 | Morohasi et al. | 364/419 |
| 5,075,896 | 12/1991 | Wilcox et al. | 382/225 |
| 5,261,009 | 11/1993 | Bokser | 382/228 |
| 5,265,242 | 11/1993 | Fujisawa et al. | 382/231 |
| 5,325,444 | 6/1994 | Cass et al. | 382/9 |
| 5,375,176 | 12/1994 | Spitz | 382/228 |
| 5,438,630 | 8/1995 | Chen et al. | 382/159 |
| 5,440,651 | 8/1995 | Martin | 382/173 |
| 5,487,117 | 1/1996 | Burges et al. | 382/228 |
| 5,524,065 | 6/1996 | Yagasaki | 382/225 |
| 5,628,003 | 5/1997 | Fujisawa et al. | 382/306 |
| 5,745,602 | 4/1998 | Chen et al. | 382/229 |
| 5,818,952 | 10/1998 | Takenouchi et al. | 382/229 |
| 5,825,926 | 10/1998 | Tanaka | 382/229 |

FOREIGN PATENT DOCUMENTS

| | | | |
|---|---|---|---|
| A 62-44878 | 2/1987 | Japan | G06F 15/40 |
| A 62-285189 | 12/1987 | Japan | G06K 9/03 |
| A 4-199467 | 7/1992 | Japan | G06F 15/40 |
| A 5-54197 | 3/1993 | Japan | G06K 9/72 |
| A 5-166008 | 7/1993 | Japan | G06K 9/46 |
| A 6-103319 | 4/1994 | Japan | G06F 15/40 |
| A 7-152774 | 6/1995 | Japan | G06F 17/30 |

OTHER PUBLICATIONS

Keyword Search for Japanese Image Text, Minoru Yusa and Yuzuru Tanaka, Faculty of Engineering, Hokkaido University, Jan. 1995.

Document Reconstruction: A Thousand Words from One Picture, Jeffrey C. Reynar, A. Lawrence Spitz and Penelope Sibun, University of Pennsylvania, Dept. Of Computer and Information Science, 1994.

A Method of Document–image Segmentation Based on Projection Profiles, Stroke Densities and Circumscribed Rectangles, Teruo Akiyama and Isao Masuda, NTT Electrical Communications Laboratories.

(List continued on next page.)

Primary Examiner—Bipin H. Shalwala
Attorney, Agent, or Firm—Oliff & Berridge, PLC

[57] ABSTRACT

The present invention provides a document processing apparatus, document processing method and a storage medium for storing thereof on purpose to offer document filing in which document can be registered with a little computation cost and with high speed, and retrieval can be performed with little oversight. In the document processing apparatus, a similar character classifying element classifies characters in a document image into similar character categories in advance and stores the classified categories together with their representative image features. When the document image is registered, a pseudo character recognizing element executes, without identifying each character in the text region, classification into character categories based on the image features less than those used in the ordinary character recognition and stores the category strings generated by identifying each character with the inputted image. In retrieval, a retrieval executing element converts each character in the retrieval keyword into nearest category, and retrieves a document including the converted category string as a part as a result of retrieval.

8 Claims, 31 Drawing Sheets

OTHER PUBLICATIONS

A Method for Composing the Extended Dictionary in which the Same Character is Involved in the Different Clusters for a Hierarchical Chinese Characters Recognition System, Akiyoshi Itoh and Takeshi Endoh, College of Science and Technology, Nihon University, and Keitaroh Hori and Tohru Shimamura, Members, Graduate School of Science and Technology, Nihon University, Jun. 1995.

Handprinted Chinese Characters Recogniton by Peripheral Direction Contributivity Feature, Norihiro Hagita, Seiichiro Maito and Isao Masuda, Members, Masahino Electrical Communication Laborator, N.T.T.

Key Search Strategies—Trie and Its Applications, by Junichi Aoe, The University of Tokushima, Faculty of Engineering Department of Information Science and Intelligent Systems, Feb., 1993.

FIG. 6

| REPRESENTATIVE CHARACTER | SIMILAR CHARACTER | REPRESENTATIVE VECTOR |
|---|---|---|
| 亜 | 亜、並、韮、埜 | (0.52,0.91, ···) |
| 阿 | 阿、河 | (0.01,0.02, ···) |
| 囲 | 囲、因、固、園、圏、図、団、··· | (0.01,0.01, ···) |
| 父 | 父、丈、文、 | (0.23,0.11, ···) |
| 家 | 家、賣、寿、妾、麦、書、喜、··· | (0.51,0.02, ···) |
| 画 | 画、函、面 | (0.01,0.48, ···) |
| 倶 | 倶、仮、偽、協、像、惚、傷、··· | (0.25,0.10, ···) |
| 絹 | 絹、旅、解、陥、流 | (0.11,0.09, ···) |
| 肝 | 肝、冴、析、祈、料、折 | (0.01,0.04, ···) |
| ⋮ | | |

FIG. 7

| CHARACTER | REPRESENTATIVE CHARACTER OF CATEGORY |
|---|---|
| 亜 | 亜 |
| 並 | 亜 |
| 韮 | 亜 |
| 埜 | 亜 |
| 父 | 父 |
| 丈 | 父 |
| 文 | 父 |
| 家 | 家 |
| 賣 | 家 |
| 寿 | 家 |
| 妾 | 家 |
| 書 | 家 |
| ⋮ | |

| Representative character code | Position in the image |
|---|---|
| あ | (15, 20, 41, 39) |
| ⋮ | ⋮ |
| 父 | (120, 340, 43, 42) |
| 家 | (165, 341, 41, 43) |
| 画 | (209, 339, 44, 43) |
| 倶 | (255, 340, 41, 42) |
| 絹 | (299, 339, 43, 43) |
| 肝 | (343, 339, 42, 42) |
| ⋮ | ⋮ |

FIG. 15
| Character | Representative character of category |
|---|---|
| 亜 | 亜 |
| 並 | 亜、平 |
| 韭 | 亜 |
| 埀 | 亜 |
| 父 | 父、交 |
| 丈 | 父 |
| 文 | 父、交 |
| ⋮ | ⋮ |
| 書 | 家 |
| ⋮ | ⋮ |
| 画 | 画 |
| ⋮ | ⋮ |
| 像 | 倶、場 |
| ⋮ | ⋮ |
FIG. 16(A)
··· [文] [書] [印] [刷] ···
FIG. 16(B)
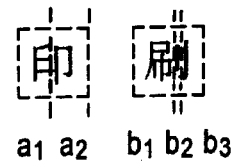
a₁ a₂   b₁ b₂ b₃

FIG. 17

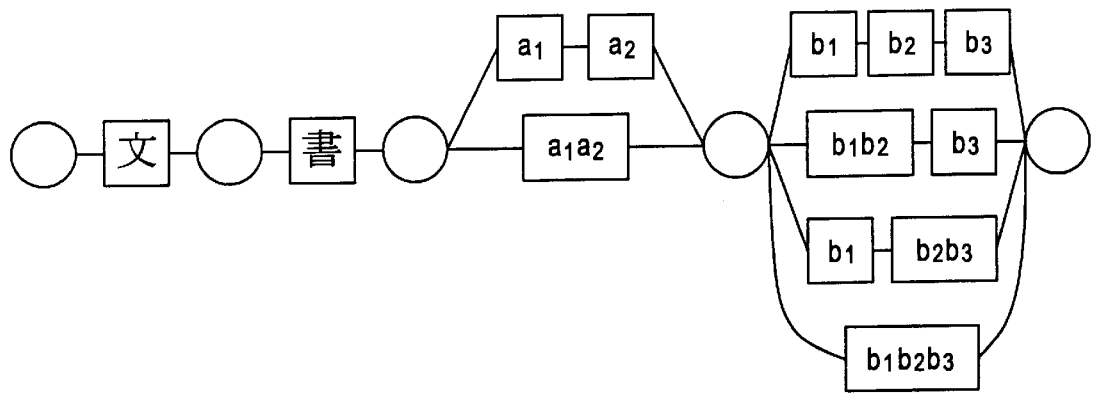

FIG. 18

| Representative character code | Position in the image, or pointer |
|---|---|
| 父 | (120, 340, 43, 42) |
| 家 | (165, 341, 41, 43) |
| o | • |
| o | • |

No. 1
| Representative character code | Position in the image | Next table No. |
|---|---|---|
| {[$a_1$]} | (210, 340, 20, 40) | 2 |
| {[$a_1a_2$]} | (210, 341, 41, 43) | 0 |

No. 2
| Representative character code | Position in the image | Next table No. |
|---|---|---|
| {[$a_2$]} | (232, 339, 19, 43) | 0 |

No. 1
| Representative character code | Position in the image | Next table No. |
|---|---|---|
| {[$b_1$]} | (256, 340, 20, 42) | 2 |
| {[$b_1b_2$]} | (256, 340, 24, 42) | 3 |
| {[$b_1b_2b_3$]} | (256, 340, 42, 43) | 0 |

No. 2
| Representative character code | Position in the image | Next table No. |
|---|---|---|
| {[$b_2$]} | (282, 345, 5, 20) | 3 |
| {[$b_2b_3$]} | (282, 340, 16, 42) | 0 |

No. 3
| Representative character code | Position in the image | Next table No. |
|---|---|---|
| {[$b_3$]} | (288, 340, 10, 42) | 0 |

| Representative character code string | Part of speech | Character word |
|---|---|---|
| ⋮ | ⋮ | ⋮ |
| 均糸 | noun | 将来 |
| ⋮ | ⋮ | ⋮ |
| 芸温 | noun<br>stem of the sa-low irregular verb | 実現 |
|  | noun | 差損 |
| 稲用 | noun<br>stem of the sa-low irregular verb | 構成 |
| ⋮ | ⋮ | ⋮ |
| さ | stem of the lower *ichidan* verb | き |
|  | suffix of the sa-low irregular verb, indicating mizen form | さ |
| ⋮ | ⋮ | ⋮ |
| れる | Auxiliary verb<br>suffix of the lower *ichidan* verb | れる |
| ⋮ | ⋮ | ⋮ |

FIG. 24

| Representative character code string | Character word | Part of speech |
|---|---|---|
| ⋮ | ⋮ | ⋮ |
| 芸温 | 実現<br>差損<br>実現 | noun<br>noun<br>stem of the sa-low irregular verb |
| ⋮ | ⋮ | ⋮ |
| 稲用 | 構成<br>構成 | noun<br>stem of the sa-low irregular verb |
| ⋮ | ⋮ | ⋮ |

FIG. 27

|  | Suffix of verb conjugations | Suffix of the sa-low irregular verb | Auxiliary verb "れる" | End of a clause | ... |
|---|---|---|---|---|---|
| stem of the sa-low irregular verb | 0 | 1 | 0 | 0 | ... |
| stem of the adjective verb | 0 | 0 | 0 | 0 | ... |
| noun | 0 | 0 | 0 | 1 | ... |
| stem of the upper *ichidan* verb | 1 | 0 | 0 | 0 | ... |
| stem of the lower *ichidan* verb | 1 | 0 | 0 | 0 | ... |
| suffix indicating mizen form | 0 | 0 | 1 | 1 | ... |
| Auxiliary verb | 0 | 0 | 0 | 1 | ... |
| ⋮ | ⋮ | ⋮ | ⋮ | ⋮ | |

FIG. 29
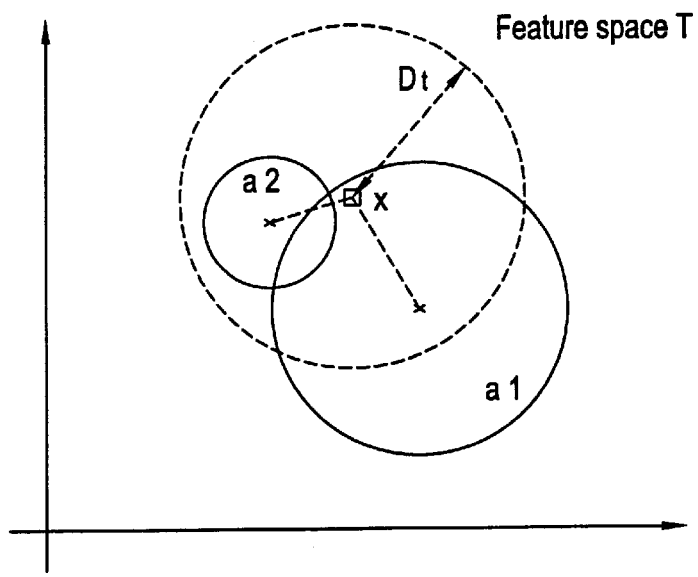
FIG. 30(A)
・・・ 自 然 言 語 処 理 ・・・
FIG. 30(B)
N = 1   自  滅  豆  記  肋  喫 ・・・
N = 2   吉  恩  吉       近  均

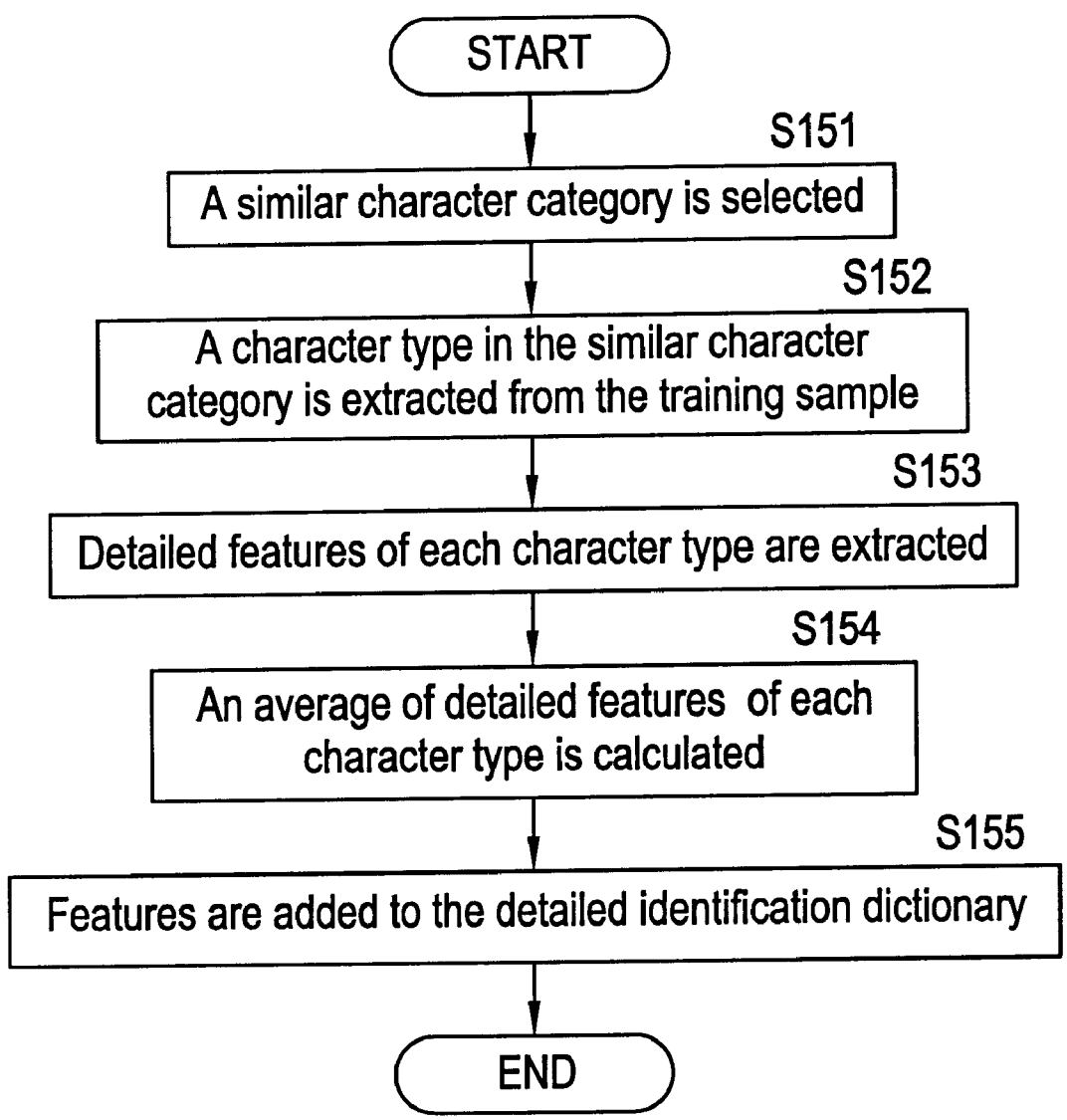

FIG. 34

| Representative character | Similar character | Detailed feature vector |
|---|---|---|
| 亜 | 亜 | (0.32, 0.54, 0.78, ···) |
|  | 正 | (0.36, 0.72, 0.29, ···) |
|  | 疋 | (0.19, 0.21, 0.54, ···) |
|  | 屯 | (0.08, 0.58, 0.11, ···) |
|  | 並 | (0.28, 0.32, 0.27, ···) |
| 阿 | 阿 | (0.65, 0.78, 0.92, ···) |
|  | 何 | (0.12, 0.32, 0.04, ···) |
|  | 河 | (0.43, 0.48, 0.57, ···) |
| ⋮ | ⋮ | ⋮ |
| 雨 | 雨 | (0.25, 0.97, 0.86, ···) |
|  | 而 | (0.34, 0.33, 0.54, ···) |
|  | 両 | (0.12, 0.54, 0.34, ···) |
|  | 丙 | (0.77, 0.64, 0.68, ···) |
| ⋮ | ⋮ | ⋮ |

METHOD AND APPARATUS FOR IMAGE BASED DOCUMENT PROCESSING

BACKGROUND OF THE INVENTION

1. Field of the Invention

The present invention relates to a document processing apparatus which reads and stores a document as an image and in particular relates to a document processing apparatus having a retrieval function for retrieving a content in a text from a document image.

2. Discussion of the Related Art

Document filing systems capable of converting a document into an image by an image input device such as an image scanner, storing thereof electronically and carrying out retrieval later have been put to practical use. However, many of such systems have required manual assignment of attributes for the retrieval using keywords or the like per every inputted image; therefore much labor has been necessary.

In the document retrieval, originally, it is desirable to carry out full-text retrieval based on the contents of the text. It is possible to execute full-text retrieval for an electronic document prepared by the desktop publishing (DTP) or the like, but it is impossible to carry out the full-text retrieval directly on the document image. Therefore, in Japanese Patent Application Laid-Open No. 62-44878 (1987), for example, it is disclosed that character recognition is performed on the text portion in a document, and the full-text retrieval is made to be possible by coding the text contents. Moreover, candidates for each character obtained in the process of character recognition are retained so that the oversight in retrieval caused by the recognition error is reduced. However, in the character recognition, and in particular in the character recognition of a document written in Japanese which has a large number of character types, feature vectors of several hundreds of dimensions are obtained and tried to match with the features of not less than approximately 3,000 character types; accordingly, the matching process of the feature vectors requires much computation cost. Besides, there is a problem of possibility that a retrieval keyword is incorrectly recognized because the rate of character recognition is not so high. Japanese Patent Application Laid-Open No. 62-285189 (1987) discloses an invention which obtains a character string well-formed as Japanese by utilizing a morphological analysis after character recognition, and automatically corrects the incorrectly recognized characters. In an invention disclosed in Japanese Patent Application Laid-Open No. 5-54197 (1993), Japanese characters are replaced with representative characters to reduce the character types to be dealt with, and then words are identified by utilizing a rate transition matrix for correcting the incorrectly recognized characters. However, these inventions basically require much computation cost in registration of documents for execution of character recognition, and if the ultimately desired object is a document image including the word designated in the retrieval, execution of character recognition would be mostly result in vain.

According to "Keyword Search for Japanese Image Text", Yusa et al., Information Media, 19-1, January 1995, features of each character image are directly converted into the 36-bit codes instead of execution of character recognition on the features obtained from each character image, and features of a retrieval keyword image is also extracted for feature matching, and thereby the character string retrieval is performed using the codes. However, it is necessary to input the retrieval keyword as an image or to generate an image by using character font image corresponding to the keyword, that is, there is a problem of weakness in the difference of the fonts used in the document image.

In "Document Reconstruction: A Thousand Words from One Picture", Reynar J. et al., in Proc. of 4th Annual Symposium on Document Analysis and Information Retrieval, pp. 367–384, Las Vegas, April 1995, it is disclosed an attempt that characters in a text image in a language of European origin (English) are classified into a small number of categories based on their sizes and positions, and identified as words according to the sequence of the categories. U.S. Pat. No. 5,325,444 (1994) or 5,438,630 (1995) discloses a technology which measures frequency of occurrence of a specific word and identifies a word without using an OCR by utilizing an image feature per word unit called "Word Shape". However, it is difficult to intuitively find a feature to be a key for a language having a large number of character types such as Japanese or Chinese. Besides, it is impossible to directly obtain word units from an image because, different from the European origin languages, there is no physical space between the words on the image. For this reason, it is difficult to directly identify the words in a text written in Japanese or the like according to the disclosed method.

Japanese Patent Application Laid-Open No. 4-199467 (1992) discloses an invention which carries out grouping character types apt to be recognized incorrectly with each other and assigns a character code to each group, which is used in retrieving. In this method, character codes are once obtained by executing a character recognition process, and then converted into those indicating the groups. Therefore, oversight in retrieval is prevented by the grouping, but much computation cost and the time for character recognition are still required.

Japanese Patent Application Laid-Open No. 7-152774 (1995) discloses a technique in which, if a character apt to be incorrectly recognized is included in character strings in the retrieval condition expression, plural candidates for the retrieval condition expression are prepared for execution of retrieval. Furthermore, in an invention disclosed in Japanese Patent Application Laid-Open No. 6-103319 (1994), if there are characters cannot be converted normally, they are left indefinite and retrieval is executed for such indefinite data. According to these techniques, oversight in retrieval can be reduced, but these techniques also require much computation cost and time for the character recognition.

SUMMARY OF THE INVENTION

The present invention has been made in view of the above circumstances and has an object to provide a document processing apparatus, document processing method and storing medium for storing thereof to offer document filing which executes a registering process with a little computation cost and with high processing speed when a document is registered, and realizes retrieval with little oversight.

Additional objects and advantages of the invention will be set forth in part in the description which follows and in part will be obvious from the description, or may be learned by practice of the invention. The objects and advantages of the invention realized and attained by means of the instrumentalities and combinations particularly pointed out in the appended claims. To achieve the objects and in accordance with the purpose of the invention, as embodied and broadly described herein, a document processing apparatus of the present invention comprises a character category storing element for storing a category of a similar character made by classification of characters based on an image feature of each character with relation to the image feature, a text region extracting element for segmenting an image of every character in an inputted image, a pseudo character recognizing element for classifying the image of every character segmented by the text region extracting element into the category stored in the character category storing element based on the image feature related to the category, a pseudo character recognition result storing element for storing the category into which the image of every character is classified by the pseudo character recognizing element with relation to the input document image, a keyword converting element for converting each character in a retrieval expression input for retrieval into the nearest category stored in the character category storing element, and a document retrieving element for retrieving document images having a category generated by converting the retrieval expression by the keyword converting element from the pseudo character recognition result storing element.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings:

FIG. 6 is an example of a similar character category table in the first embodiment of the document processing apparatus according to the present invention;

FIG. 7 is an example of a character code-category correspondence table in the first embodiment of the document processing apparatus according to the present invention;

FIG. 15 illustrates an example of a character code-category correspondence table in the case where grouping into plural categories is permitted in a first variation of the first embodiment of the document processing apparatus according to the present invention;

FIGS. 16(A) and 16(B) illustrate a concrete example of positions of segmentation in the case where plural character extraction interpretations are possible in a second variation of the first embodiment of the document processing apparatus according to the present invention;

FIG. 17 illustrates relation between the segmented character strings in the case where plural character segmentation interpretations are possible in the second variation of the first embodiment of the document processing apparatus according to the present invention;

FIG. 18 illustrates an example of a representative character code table in the case where plural segmentation interpretations are permitted in the second variation of the first embodiment of the document processing apparatus according to the present invention;

FIG. 24 illustrates an example of a code conversion table in the second embodiment of the document processing apparatus according to the present invention;

FIG. 27 illustrates an example of a dictionary of part of speech connection in the second embodiment of the document processing apparatus according to the present invention;

FIG. 29 shows an example of incorrect recognition of the representative character code;

FIGS. 30(A) and 30(B) illustrate an example of conversion into representative character code string in the case where N=1 and N=2 in a first variation of the second embodiment of the document processing apparatus according to the present invention;

FIG. 33 is a flow chart showing an example of procedures in preparing the detail identification dictionary in the second variation of the second embodiment of the document processing apparatus according to the present invention;

FIG. 34 illustrates an example of the detail identification dictionary in the second variation of the second embodiment of the document processing apparatus according to the present invention;

DETAILED DESCRIPTION OF THE PREFERRED EMBODIMENTS

Preferred embodiments of a document processing apparatus according to the present invention are now described in detail based on the drawings.

First Embodiment

Figure 1:
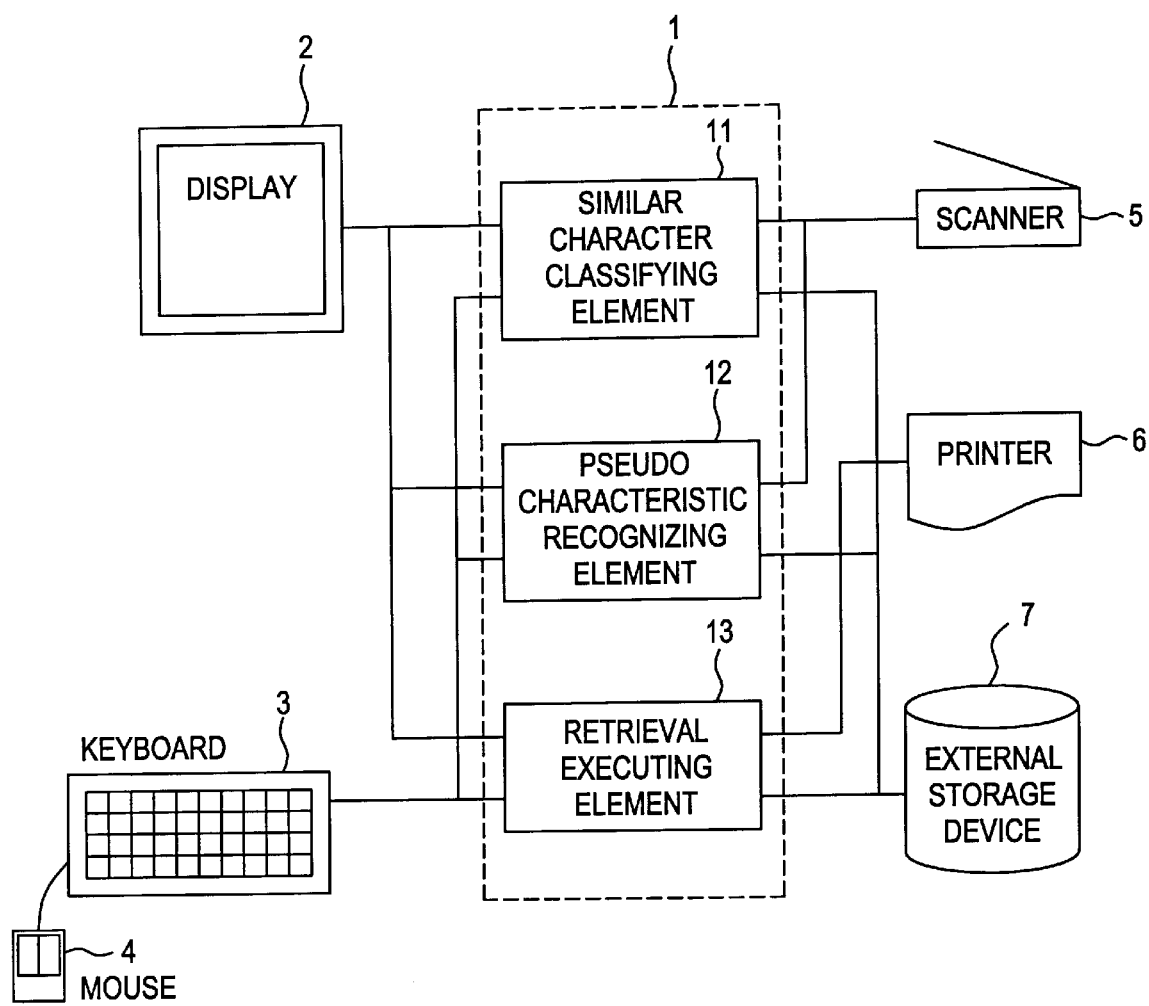
FIG. 1 shows the construction of a first embodiment of document processing apparatus according to the present invention.

FIG. 1 shows the construction of a first embodiment of a document processing apparatus according to the present invention. In the figure, a keyboard 3 and mouse 4 for directing operation, a display 2 for showing a result, an image scanner 5 for inputting a document, a printer 6 for printing and outputting the result, an external storage device 7 for storing programs or data to be processed, and so on are connected to a processor 1. The processor 1 executes processes actually according to software stored in the external storage device 7. The processor 1 may be, for example, an ordinary computer. As the external storing device 7, a hard disk capable of quick access is adopted, for example. Or, the external storage device 7 may be a mass storage device such as an optical disk for retaining a large amount of document images.

The processor 1 executes the software which consists of a similar character classifying element 11, a pseudo character recognizing element 12 and retrieval executing element 13. The similar character classifying element 11 classifies object characters into categories each of which consists of similar characters based on features of the image. Here, a similar character category table which is necessary for registration of document and a character code-category correspondence table necessary for retrieval are generated.

These two tables are sufficient for actual document registration and retrieval, and therefore, the processes here are executed only in advance of inputting the document image. The similar character category table stores the sets of character codes representing a category, a character code of one or more characters actually belong to the category and an image feature vector representing the category. The character code-category correspondence table is a reverse table of the similar character category table and is used for converting a retrieval keyword into the representative character code string.

The pseudo character recognizing element 12 extracts text regions from the inputted document image, classifies characters contained in each of the text regions into the pseudo-character categories, assigns representative character codes to the categories, and stores them with the positions of the corresponding characters in the image in the external storage device 7.

The retrieval executing element 13 requests the user to type in the retrieval expression, and if the retrieval expression is inputted, the element 13 converts the keyword included in the retrieval expression into the representative character code string of the category by the character code-category correspondence table, fetches the document images including the code string of the converted keyword, and shows it with the position of the retrieved keyword to the user.

Figure 2:
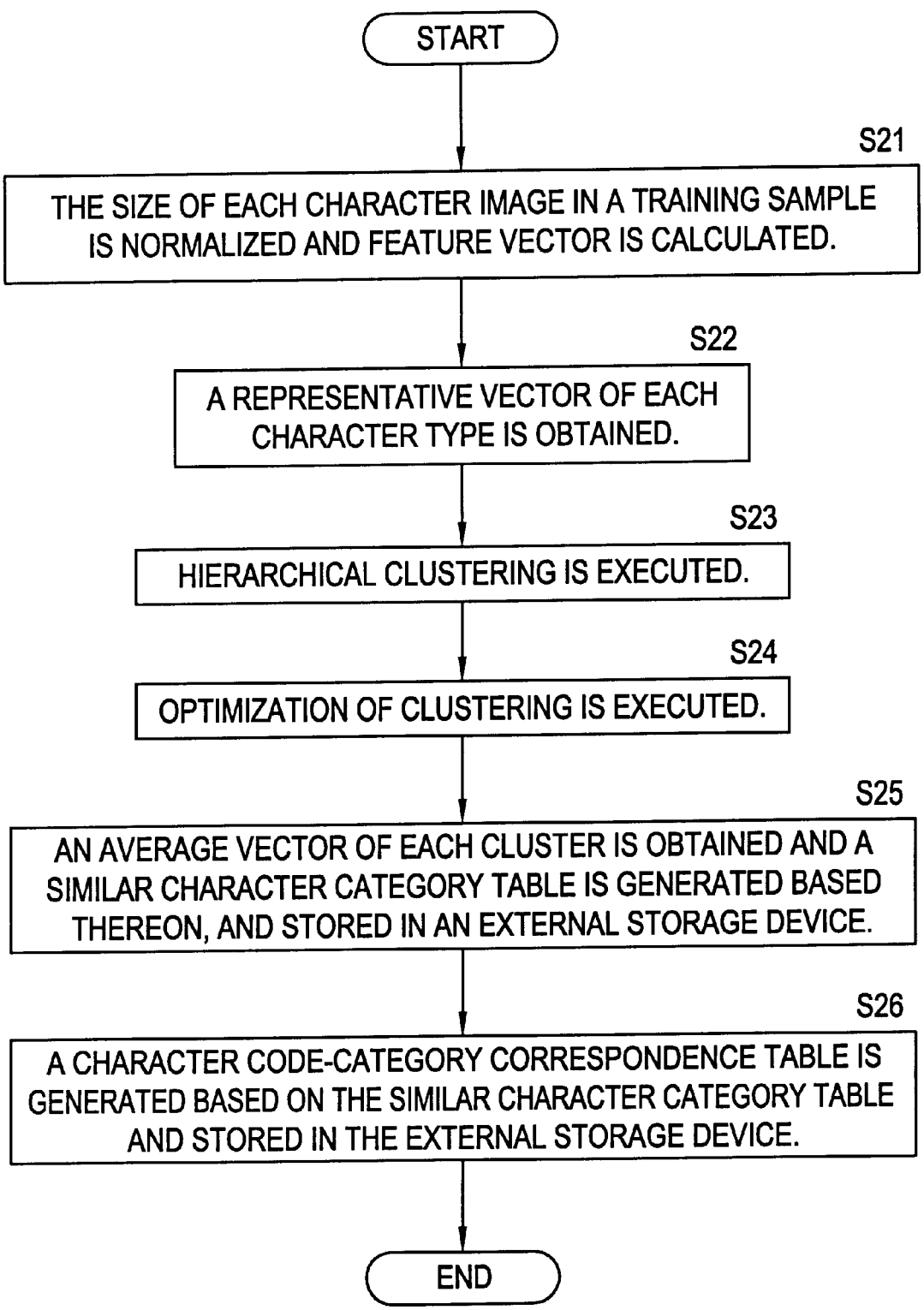
FIG. 2 is a flow chart showing an example of a process in similar character classifying element in the first embodiment of the document processing apparatus according to the present invention.

Details of processes of each element are now explained. FIG. 2 is a flow chart showing an example of the process of the similar character classifying element. The similar character classifying element 11 constructs the similar character category table and the character code-category correspondence table based on training samples of character image included in each of the similar character categories as the input. The training sample consists of binary character images and character codes corresponding thereto. The training samples of various fonts, having different threshold values for binarization, and so forth are prepared for all character types.

Figure 3:
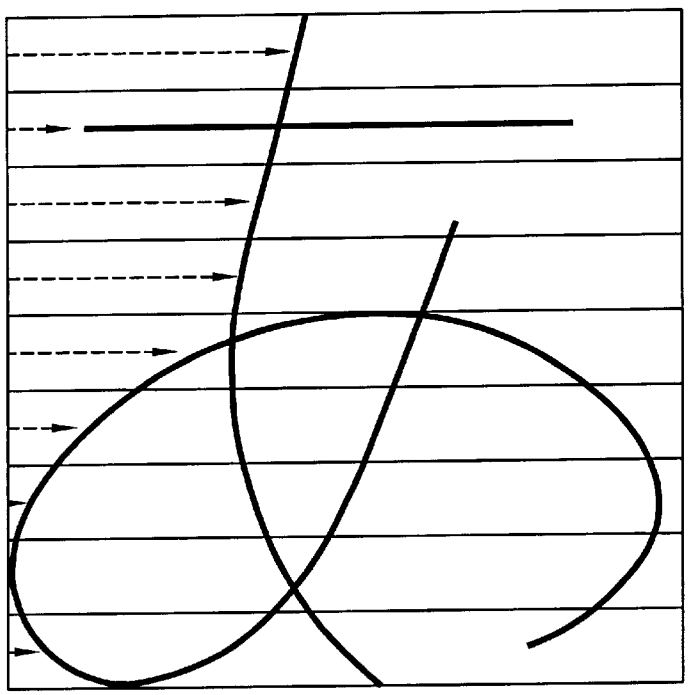
FIG. 3 illustrates a peripheral feature.

First, in step 21, normalization of the size of each character image is executed as a preprocess. Here, it is assumed that the normalized size is 64×64 (pixels). Next, the feature extraction is carried out. The peripheral feature is used here, which is illustrated in FIG. 3. As shown in the figure, scanning is started from each side of a circumscribing rectangle of the character to take a distance from the starting point to the point at which a white pixel changes to a black pixel as the feature, wherein the first changing position and the second changing position are extracted. Here, it is assumed that character image is divided into 8 regions in each of the horizontal direction and the vertical direction to be scanned, and the feature vectors of 8×4×2, total 64 dimensions are extracted. FIG. 3 shows the case where the scanning is started from the left side of the circumscribing rectangle, and the scanning locus from the starting point to the point at which the white pixel firstly changes to the black pixel is indicated by a broken arrow. In ordinary character recognition, other features are used together to improve the precision of recognition. However, sufficient precision is expected with the feature vectors of the small number of dimensions because it is enough to classify the characters into the small number of similar character categories. It may be possible to generate the feature vectors by extracting other features instead of, or together with the peripheral feature.

If the feature vectors are obtained for each character of the training sample, an average of the feature vectors which are the different fonts or different threshold values for binarization for the same character type (for example, "亜",) is calculated, and thereby a representative vector is generated for each character type. If distances among the representative vectors of plural characters are small in a feature space, these plural characters are the similar characters. In step 23, a clustering process, namely, grouping the characters whose representative vectors are close together, is carried out. For clustering, a method such as described in "Pattern Classification and Scene Analysis", Duda and Hart, Wiley-Interscience, can be used. According to this method, the hierarchical clustering is first carried out and the result is assumed to be first clusters, and then optimization is performed so that the sum of squares of differences between the centers of gravity of each of the clusters and the feature vectors corresponding thereto becomes minimum.

Figure 4:
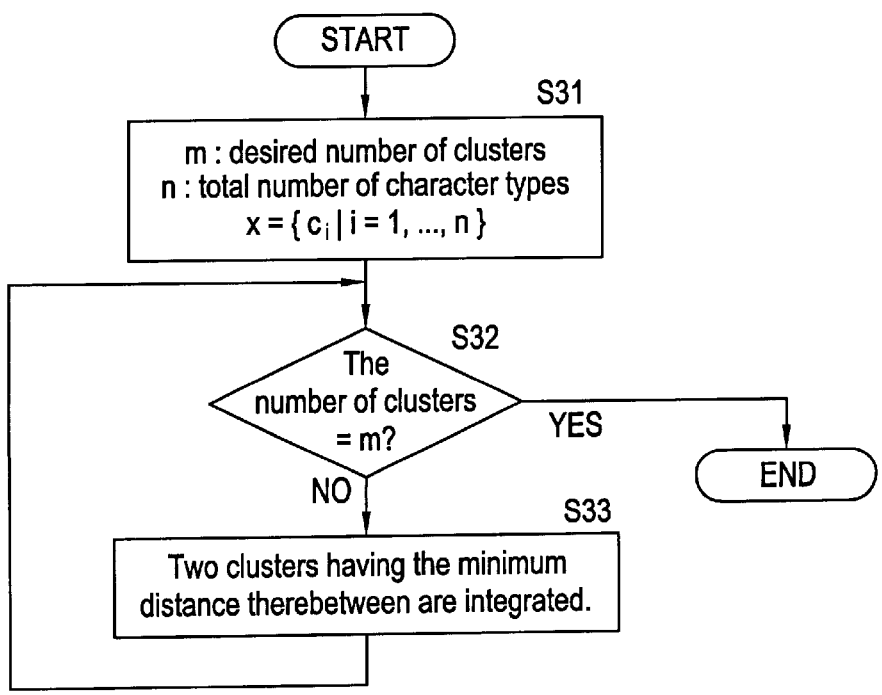
FIG. 4 is a flow chart showing an example of a process of hierarchical clustering.

FIG. 4 is a flow chart showing an example of process of the hierarchical clustering. In step 31, it is assumed that the desired number of clusters is m, the total number of character types is n, the first cluster is $X=\{c_i|i=1,\ldots,n\}$ and in $c_i$, the representative feature vector of similar character types is retained. As the initial value of $c_i$, the representative feature vector of each of the character types is inputted one by one. In step 32, the current number of clusters and the desired number of clusters m are compared with each other. If the current number of clusters is equal to m, X at that time is determined to be the result of the clustering and the process is finished. Otherwise, the process proceeds to step 33. In step 33, a pair of clusters having the shortest distance d between in the feature space is found and they are integrated into one cluster, and then the process returns to step 32.

The desired number of clusters m can be arbitrarily given, but it is assumed to be 500 here. JIS level-1 kanji set has 3,000 character types approximately, and accordingly, one cluster has 6 character types on average. In this process, various methods for calculation of the distance d between the clusters may be considered. Here, a method is adopted such as extracts arbitrary one feature vector from each of two clusters to make a pair of vectors, and assumes the shortest distance between the pairs of vectors among those generated as described to be the distance of the two clusters.

Since the result of the hierarchical clustering cannot be considered to be the optimum one, optimization of the cluster is executed in step 24 of FIG. 2 based on the result of the hierarchical clustering as a starting point. For optimization, the sum of squares of distances between the average value of feature vectors in each cluster and each the feature vector is calculated and the sum total of squares as to all clusters is regarded as a decision function. The smaller the value of the decision function is, the better the clustering is, because it means the cluster is more packed with the feature vectors. In general, it is difficult to find the clustering which minimizes the value of the decision function, but pseudo optimization is possible.

Figure 5:
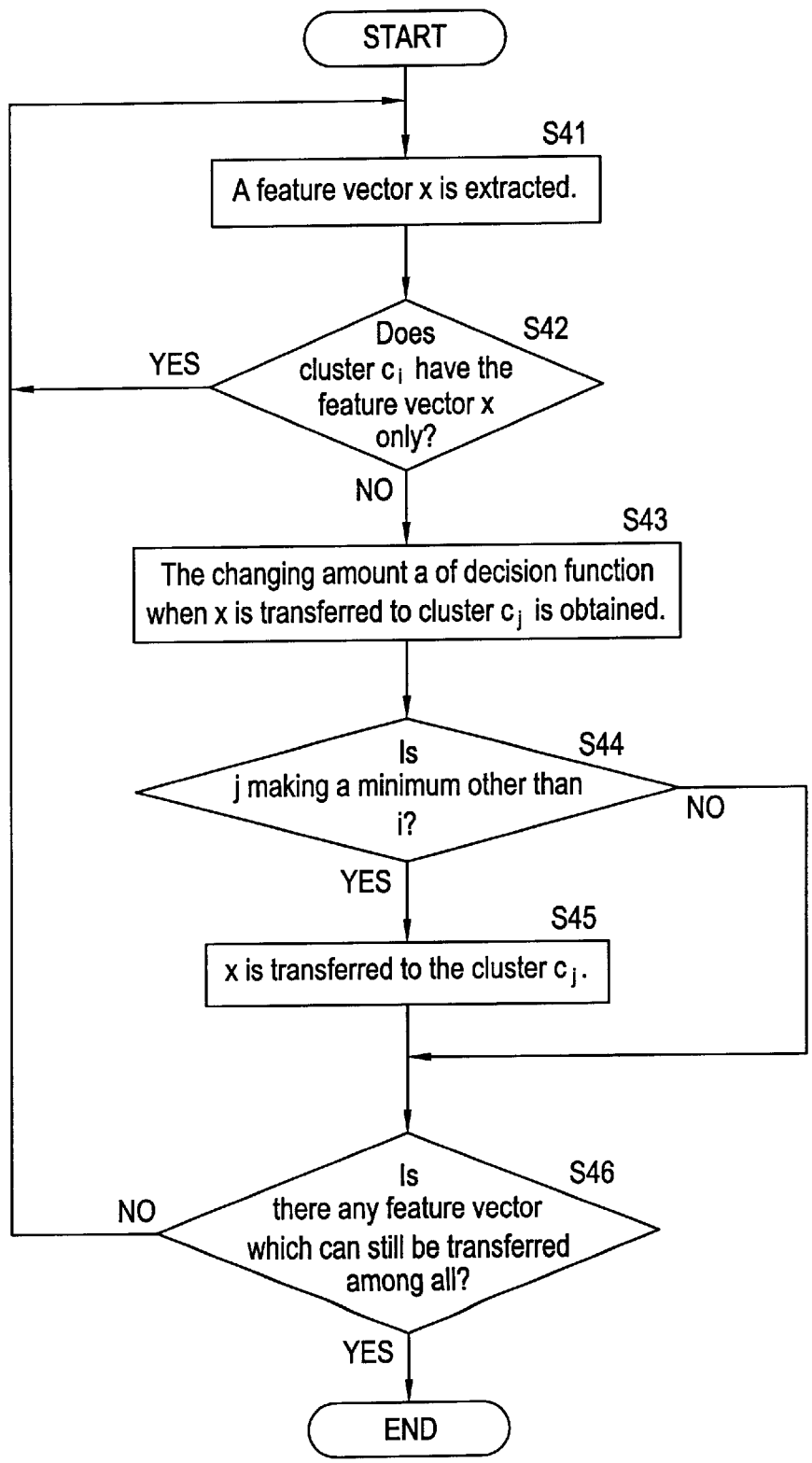
FIG. 5 is a flow chart showing an example of optimization process of clustering.

FIG. 5 is a flow chart showing an example of the process of optimization of the clustering. First, in step 41, an arbitrary feature vector x is extracted. In step 42, a cluster to which the feature vector x currently belongs is assumed to be $c_i$ and whether the feature vector registered therein is only x or not is determined. If the registered feature vector is only x, the process returns to step 41. Otherwise, one of the following calculations is executed on all clusters $c_j$.

$$a=n_j/(n_j+1)\|x-m_j\|^2$$

when $j \neq i$ $$a=n_j/(n_j-1)\|x-m_i\|^2$$

when $j=i$ wherein $n_j$ is the number of feature vectors registered in $c_j$, and $m_j$ is the average of the feature vectors belonging to $c_j$. The above expressions represent the amount of changing of the decision function in the case where the feature vector x is transferred to $c_j$.

In step 44, it is determined whether j making the calculated value a the minimum is other than i or not, and if j making the value a the minimum is other than i, the feature vector x is transferred to the cluster $c_j$ in step 45.

In step 46, it is determined whether it has already been impossible to transfer any feature vector between clusters, and if the transfer is still possible, the process returns to step 41 to repeat the processes in step 42 and subsequent thereto, assuming the next feature vector to be x. If it is determined that the transfer of all feature vectors between clusters has been completed, the cluster at the time is regarded as the result, and the process is completed.

As described above, clustering of similar characters is performed. In the processes shown in FIG. 5, various methods can be adopted for extracting an arbitrary character in step 41 and similar processes can be executed, and the clustering making the evaluation function (sum total of squares of distances between the average value of feature vectors in every cluster and each of the feature vectors) minimum can be adopted.

Returning to FIG. 2, in step 25, the similar character category table is generated based on each cluster and then stored, which is used for registration of a document. FIG. 6 illustrates an example of the similar character category table in which each category consists of a representative character code of the category, codes of similar characters belonging to the category and a representative vector of the category feature. The category feature vector is the average of feature vectors of characters belonging to the category. As a representative character code of the category, arbitrary one is assigned which is selected from the character codes of similar characters belonging to the category. In FIG. 6, characters themselves are entered instead of the character codes.

Further, in step 26, the character code-category correspondence table is simultaneously generated as the reverse table of the similar character category table for converting the retrieval keyword into the representative character code string in the retrieving process. FIG. 7 illustrates an example of the character code-category correspondence table. As shown in the figure, the character code-category correspondence table is generated by making the sets of a character code and a representative character code of the category corresponding to the character code.

Figure 8:
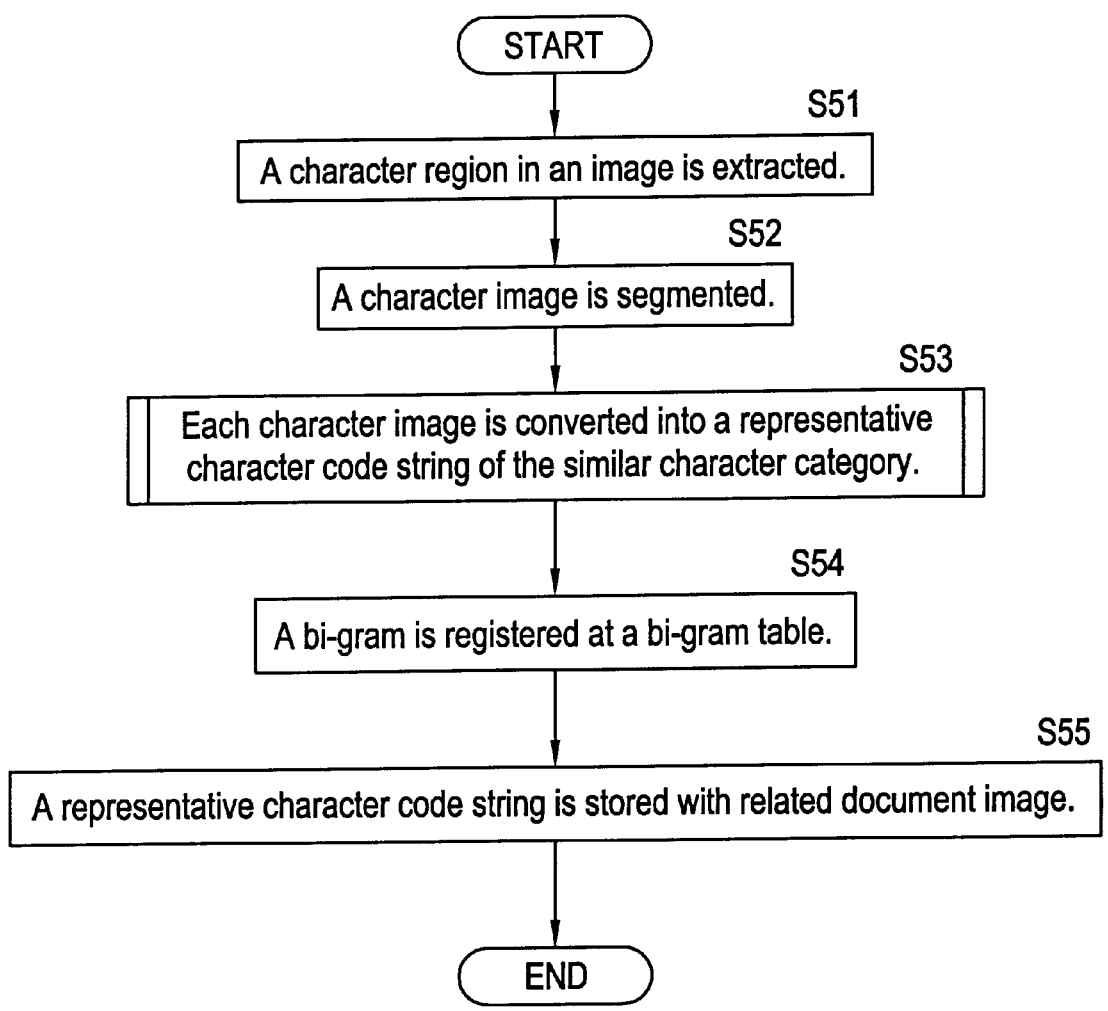
FIG. 8 is a flow chart showing an example of a process of pseudo character recognition in the first embodiment of the document processing apparatus according to the present invention.

Next, the process of document registration carried out in the pseudo character recognizing element 12 is described. FIG. 8 is a flow chart showing an example of the process of the pseudo character recognizing element. At first, the user inputs a document desired to be registered as an image by utilizing a connected image scanner 5 or the like. In some cases, the document is transmitted through a facsimile or network and inputted. Here, it is assumed that a monochrome binary image is inputted, but it is possible to input the document as a gray-scale or color image one, and at the time of inputting to the pseudo character recognition process, convert it into the binary image by the threshold value processing. As a preprocess for the inputted binary image, noise removal, skew correction and so forth are executed.

In step 51, the character regions included in the binary image are extracted. As this process, the region division method by peripheral distribution disclosed by "Region division of document image using characteristics of peripheral distribution, linear density and circumscribing rectangle in combination", Akiyama and Masuda, The Transactions of the Institute of Electronics, Information and Communication Engineers D-II, vol. J69, No. 8, for example, can be used. As a matter of course, various methods have been proposed for the region division process, and the method is not limited to those based on peripheral distribution as described here. The region determined to be the graphical image is excluded from the object of processing. The divided character block regions are assigned the numbers called block IDs in order as the rectangular regions, and stored in a memory.

Figure 9A:
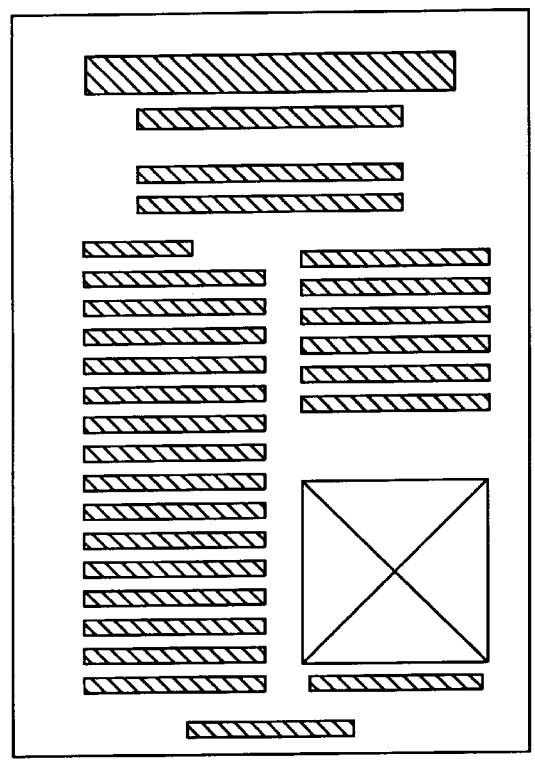
FIGS. 9(A) and 9(B) illustrate an example of a result of character region extraction in the first embodiment of the document processing apparatus according to the present invention.
Figure 9B:
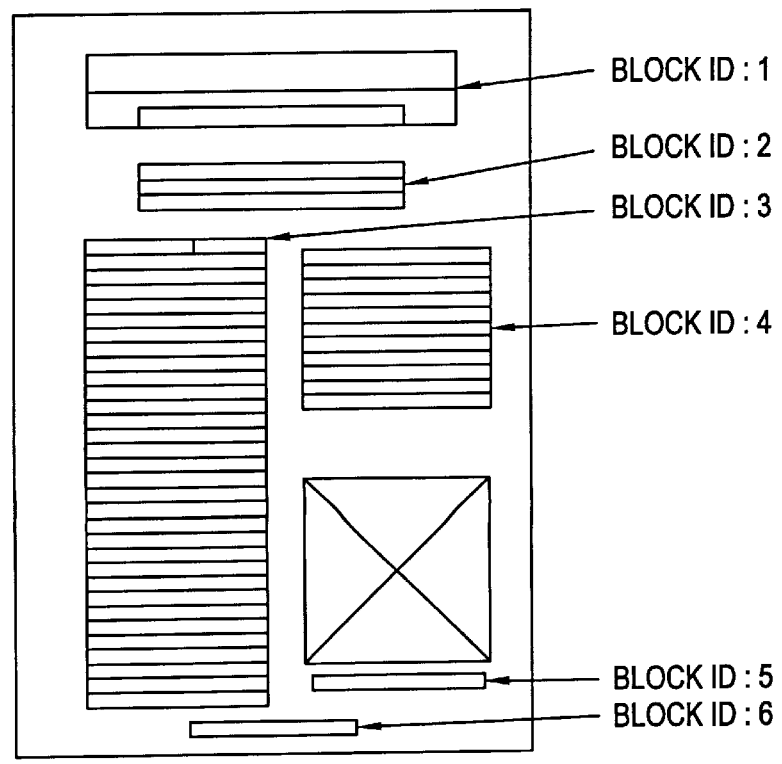

FIGS. 9(A) and 9(B) illustrate an example of the result of character region extraction. FIG. 9(A) shows an example of an inputted document image: hatched portions represent the lines in which characters are in a row; and an x-ed portion represents the graphical image region. If such a document image is inputted, for example, it is divided into the character block regions marked with bold frames and the graphical image region as shown in FIG. 9(B), and the block IDs are assigned to the character block regions. In FIG. 9(B), the block IDs 1–6 are assigned.

Returning to FIG. 8, in step 52, the character region is divided into lines, and further divided into characters. Regarding the character segmentation process, various methods have also been proposed, and any of them will suffice.

Figures 10, 11A, 11B:
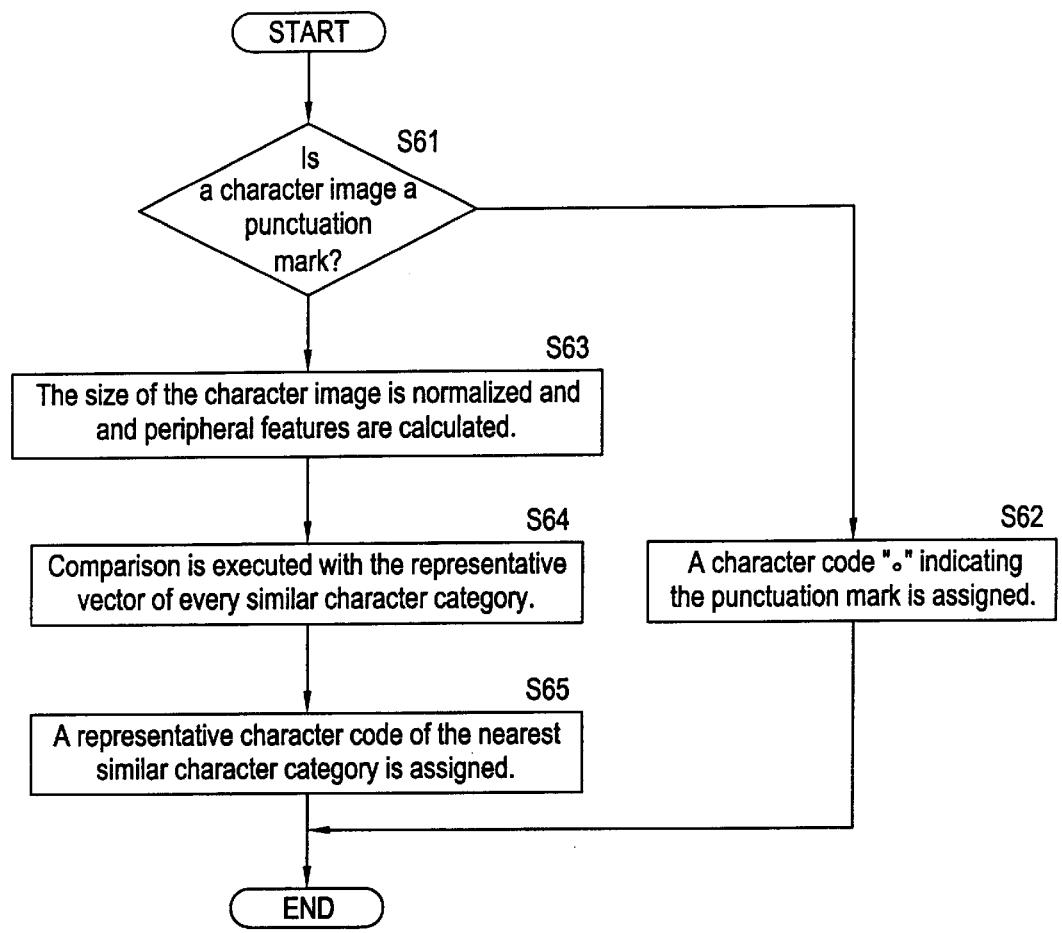
FIG. 10 is a flow chart showing an example of a process of conversion to a representative character code string in the first embodiment of the document processing apparatus according to the present invention.
FIGS. 11(A) and 11(B) illustrate an example of a result of the process of conversion to the representative character code string in the first embodiment of the document processing apparatus according to the present invention.

In step 53, each segmented character image is converted into the representative character code of the similar character category. FIG. 10 is a flow chart of an example of process of conversion into the representative character code string. At first, punctuation marks which cannot obviously be the retrieval keywords are extracted. In step 61, it is determined whether a character image is a punctuation mark or not. In the determination process, the punctuation mark satisfies the conditions that the width and height of the circumscribing rectangular of the character image are not more than the threshold values Tw and Th, respectively, the upper end of the circumscribing rectangular is lower than the center of the character line, and the distance to the right-adjacent character is larger than the threshold value Tr. Since the width and height of the Japanese character are approximately equal, the threshold values Tw, Th and Tr may be set to, for example, Tw=Th=Tr=h/2, provided that the height of the character line is assumed to be h. To the character determined to be the punctuation mark, the character category "○" indicating the punctuation mark is assigned in step 62.

If the character image is not determined to be the punctuation mark, its size is normalized in step 63 as completely same as the similar character classification process, and the image feature is calculated. The peripheral feature has been extracted in the similar character classification process; therefore, the peripheral feature is calculated here according thereto. Next, in step 64, it is determined to which of the similar character categories the feature vector of the unknown character belongs. That is, the Euclid's distances between the feature vector of the unknown character and the representative vectors of the similar character categories are calculated for comparison. The representative vectors can be used because they have been registered at the similar character category table. In step 65, the similar character category whose Euclid's distance which has been calculated is the minimum is adopted as the character category, and its representative character code is outputted as the result. The identification method utilizing the minimum distance is used here for simplification, but there are other various identification methods, and any of them may be used.

FIGS. 11(A) and 11(B) illustrate an example of process of conversion into the representative character code string. If it is assumed that the inputted character images are ". . . 文書画像解析 . . . " as shown in FIG. 11(A), the first character image "文" is segmented at the beginning and its feature vector is obtained. Next, the distances from the representative vector of each of the categories stored in the similar character category table are calculated, and the representative character code of the category having the minimum distance is assigned thereto. For example, if the similar character category table as shown in FIG. 6 is registered, the result of conversion of all character images into the representative character codes in order is the string of the representative character codes of the categories ". . . 父家画倶絹肝 . . . ".

An ordinary character recognition is not carried out here, and merely the matching with the small number of character categories is executed by utilizing the feature vectors of a small number of dimensions. Though the similar character codes are registered at the similar character category table, the similar character codes are not used at this time because the character recognition is not carried out here.

In this way, in the process of conversion into the representative character code string, the processing speed can be greatly improved because only the matching process with the small number of character categories is necessary. The matching uses the Euclid's distance, and the amount of calculation is approximately in proportion to the number of dimensions of the feature vectors and the number of identification categories. Now if it is assumed that the number of character types which are the objects of identification is 3,000, the number of similar character categories is 500, the number of dimensions of the feature vectors in the case of the ordinary character recognition is 300 and the number of dimensions of the feature vectors in the case of this method is 64, the amount of calculation for matching is not more than 1/28 of the amount of calculation in the ordinary character recognition in total. As the method of accelerating the speed of character recognition for Japanese characters, a hierarchical identification method such that some tens to some hundreds of similar character types are extracted by utilizing the feature vectors of the small number of dimensions (rough classification), and more detailed identification is executed by utilizing the feature vectors with more dimensions (detailed classification) is known. If it is assumed that even the vectors of the number of dimensions same as those of the method used in this embodiment is utilized for the process of the rough classification in such a method described above, matching with all character types (3,000) is necessary, and besides, the detailed classification is further required; accordingly, the amount of calculation in total is not more than 1/6 of the amount of calculation in the ordinary character recognition.

Returning to FIG. 8, it is ineffective to directly search for the representative character code string obtained in step 53 in the process of retrieving; therefore, indexes for retrieval are prepared and their contents are updated whenever any document is registered. Here, the index according to bi-gram is adopted, and registration at the bi-gram table is executed in step 54. The bi-gram refers to a partial character string consisting of two successive characters in a character string. That is, in the case of the character string "父家画倶絹肝", bi-grams "父家", "家画", "画倶", "倶絹", and "絹肝" are obtained. The bi-grams of all representative character code strings are extracted and made to be the indexes of a table, and then the document image ID and the position of the bi-grams in the representative character code string are stored.

Figures 12, 13:
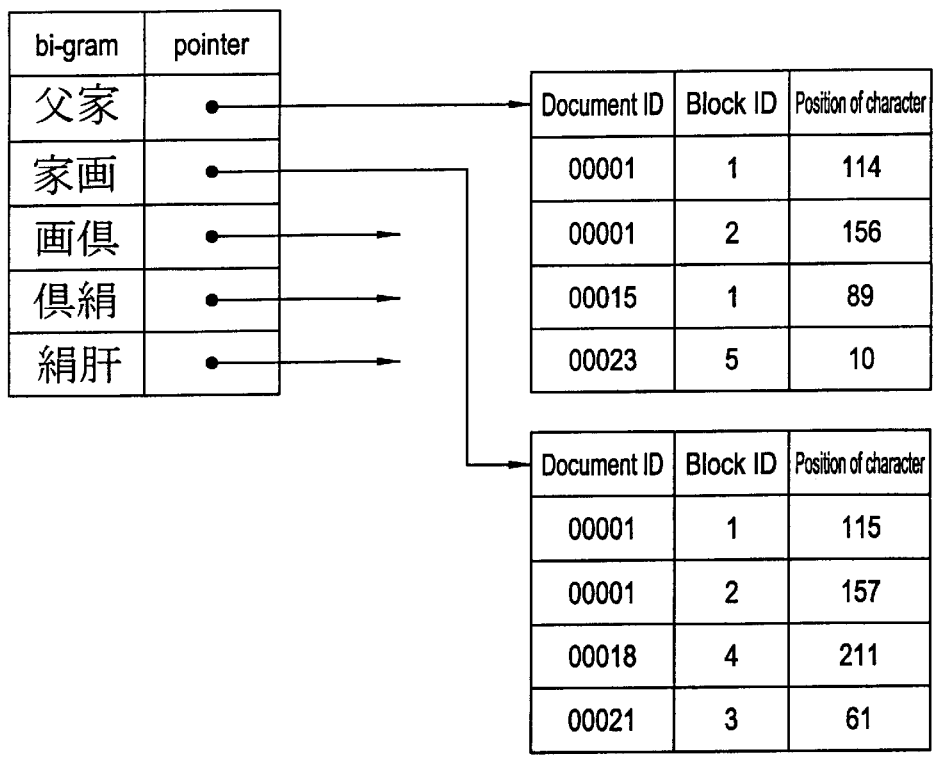
FIG. 12 illustrates an example of bi-gram table in the first embodiment of the document processing apparatus according to the present invention.
FIG. 13 illustrates an example of a representative character code table in the first embodiment of the document processing apparatus according to the present invention.

FIG. 12 illustrates an example of the bi-gram table. In the figure, the bi-gram table of the representative character code string "父家画俱絹肝" obtained corresponding to the character string "文書画 像解析" used in the above example is shown. The bi-gram table shown in FIG. 12 consists of two stages. The first stage regards the bi-gram as a key and stores a pointer to a table showing the content of the bi-gram, and the table indicated by the pointer consists of sets of the document ID, the block ID indicating which region the bi-gram belongs to, and the character position, and whenever the corresponding bi-gram is found in the character block in an inputted document, its entry is added. The bi-gram table can be implemented by the technique which is publicly known, such as B-tree or Hash table using the bi-gram as a key, and thereby high-speed retrieval is available. For the character image determined to be the punctuation mark, no bi-gram is generated.

Returning to FIG. 8, in step 55, the representative character code string obtained in step 53 is registered at the representative character code table per every character block with its position in the image, and stored in the external storage device 7 or the like with the inputted image. FIG. 13 illustrates an example of the representative character code table which makes sets of each representative character code and the position of the rectangle where the character code occupies in the image, and stores them. In FIG. 13, the characters themselves are entered in the table instead of the representative character codes. The position of the rectangle where the character code occupies in the image is represented by (top-left x-coordinate, top-left y-coordinate, width, height). By execution of the above procedures, the registration process for the inputted document image is completed.

Figure 14:
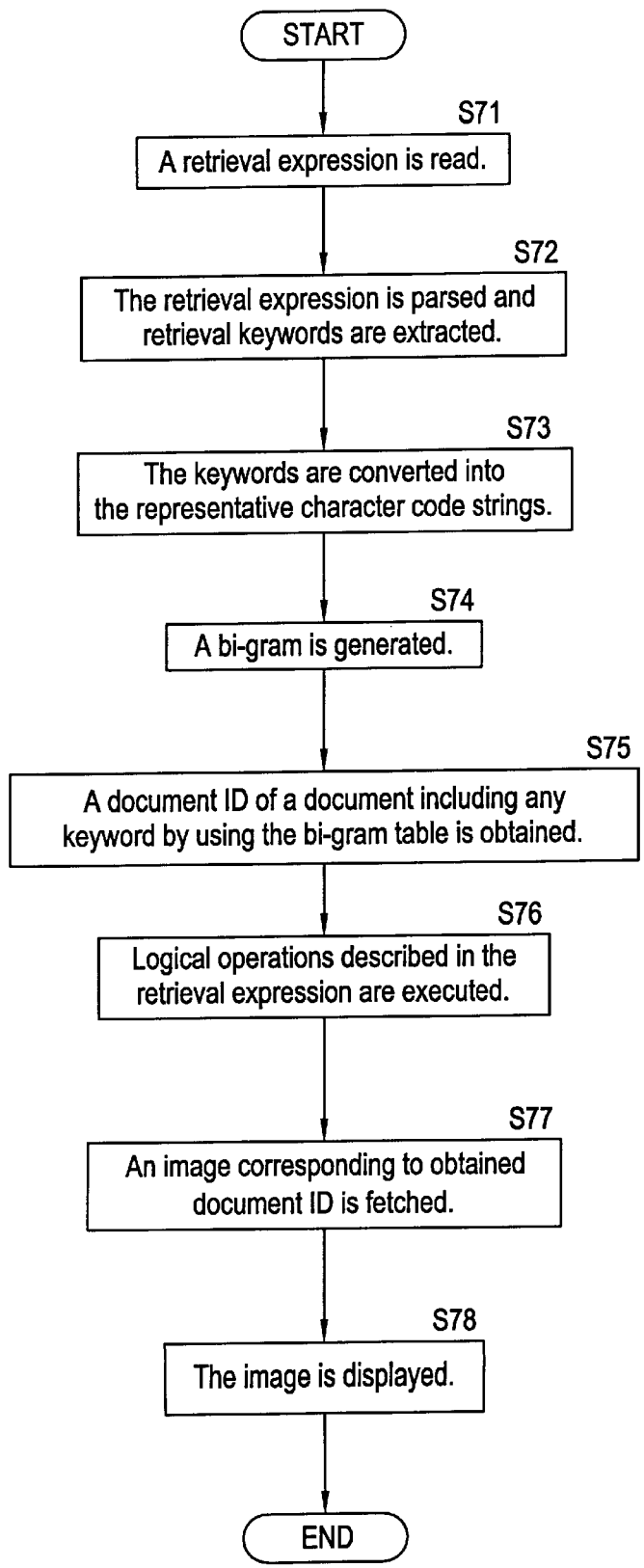
FIG. 14 is a flow chart showing an example of a process of a retrieval executing element in the first embodiment of the document processing apparatus according to the present invention.

Finally, the retrieving process in the retrieval executing element 13 is described. FIG. 14 is a flow chart showing an example of the process in the retrieval executing element. The retrieval executing element 13 waits until the user inputs a retrieval expression. As the user inputs the retrieval expression by the keyboard 3, for example, while watching the display 2, the retrieval executing element 13 reads the inputted retrieval expression in step 71. Though various forms are possible for the retrieval expression, but it is assumed here that the retrieval expression is formed with retrieval keywords combined by the Boolean operators such as OR, AND or logical NOT.

After the retrieval expression is read, the keywords in the retrieval expression are extracted by parsing the retrieval expression in step 72, and the keywords in the retrieval expression are converted into the representative character code string of the category with reference to the character code-category correspondence table. As a specific example, the case where the retrieval expression is "文書画 像＊解析" is considered. Here, "＊" represents AND. This retrieval expression means the direction to retrieve the document image including both of the words "文書画 像" and "解析". These two keywords are converted into the corresponding representative character code strings, "父家画俱" and "絹肝", respectively, with reference to the character code-category correspondence table.

Next, it is examined whether there is any representative character code string which includes the representative character code strings converted from the two keywords or not among those obtained from the registered document image, and if any, its position in the image is stored. Actually, in step 74, the bi-grams of the representative character code string corresponding to the keyword are generated, and in step 75, the generated bi-grams are retrieved from the above-described bi-gram table, and thereby the ID of the document image corresponding to the bi-grams and the positions of appearance of the bi-grams are obtained. If the retrieval keyword has at least three characters, it is necessary that plural bi-grams are generated and these bi-grams successively appear in the same character block of the same document. Accordingly, the positions of appearance of the bi-grams are traced in order as to the same block ID of the same document image ID, and the bi-grams which do not appear successively are deleted.

In the example of the retrieval expression described above, the bi-grams "父家", "家画" and "画俱" are generated from the keyboard "父家画俱", and the keyboard "絹肝" is directly regarded as the bi-gram "For example, it is assumed that the bi-gram table as shown in FIG. 12 is generated. The bi-gram "父家" is included in three documents whose document IDs are 00001, 00015, and 00023. In the document having the document ID 00001, the position of the bi-gram "父家" in each of the block IDs 1 and 2 is directly followed by the bi-gram "家画". However, in each of the documents having the document IDs 00015 and 00023, the bi-gram "家画" is not subsequent to the bi-gram "父家". Consequently, it turns out that the document having the document ID 00001 includes the character string "父家画". The same process is executed as to the bi-gram "画俱", and finally the document ID of the document including the character string "父家画俱" can be obtained. Since "絹肝" is a word consisting of two characters, it is sufficient to only examine the corresponding bi-gram table. In this way, the document IDs of the documents in which the retrieval keywords appear and its positions of appearance are obtained.

At last, logical operation in the retrieval expression is executed in step 76. That is, the logical operation is executed on the set of the document IDs of the documents including each of the retrieval keywords, and finally the set of the document IDs which matches the retrieval expression is obtained. For example, if the sets of the document IDs including the representative character code strings "父家画俱" and "絹肝" corresponding to the keywords are (00001, 00031, 00202) and (00001, 00054, 00202), respectively, the result of AND on these sets is (00001, 00202). That is, each of the document images having the document IDs 00001 and 00202 includes both of the representative character code strings "父家画俱" and "絹肝".

In step 77, the document images corresponding to the document IDs obtained as described above are taken out of the external storage device 7, for example, and displayed in order on the display 2 in step 78. Because the positions of the characters can be obtained from the representative character code table on the image stored with the image in accordance with the obtained block IDs and positions of characters, the corresponding characters are highlighted. The highlight display may be the black-and-white inversion display or the display with a distinguishable color in the case of the color display. If the user gives the direction as to printing after confirming the result, the document images are outputted to the printer 6.

Next, a first variation of the first embodiment of the document processing apparatus according to the present invention is described. The first variation is an improvement of the retrieving precision. As described in "A method for Composing the Extended Dictionary in which the Same Character is Involved in the Different Clusters for a Hierarchical Chinese Characters Recognition System", Ito et al., The Transactions of the Institute of Electronics, Information and Communication Engineers D-II, vol. J78, No. 6, pp. 896–905, if the clustering is performed by utilizing the representative vector which is an average of feature vectors of the same character type, actual character images cannot be classified properly into categories corresponding thereto in some cases. To avoid this inconvenience, component $\epsilon$-component extension method disclosed in the above article can be used. That is, after clustering is performed by utilizing the representative vector of each character type, Euclid's distance between the feature vector of each of the character images of the testing sample and the representative vector of each category is calculated, and then a character code is assigned to all categories which exist within the minimum Euclid's distance or the distance obtained by adding the scalar parameter $\epsilon$ to the minimum Euclid's distance, and registers them as similar characters. If the value of $\epsilon$ becomes larger, the precision of the pseudo character recognition is further improved. However, since the number of character codes included in one category is increased, there are more possibilities of outputting an incorrect result in retrieval. To determine an optimum value of $\epsilon$, a set of unknown character images which is different from the testing sample is prepared at first. Then the pseudo character recognition process is performed against various values of $\epsilon$ by utilizing the extended similar character category, and as a result, $\epsilon$ is set to the minimum value such that the character code is correctly included in the categories identified with all characters in the set of unknown character images.

In this case, in the character code-category correspondence table for retrieval, plural similar character categories correspond to one character code. FIG. 15 illustrates an example of the character code-category correspondence table in the case where the classification into plural categories is permitted. In the example of FIG. 15, for instance, the character "絹肝" is classified into two categories: one of which has the representative character "亜" and the other one has the representative character "平". In some cases, one character is classified into three or more categories, though not shown in FIG. 15.

Because one character is classified into plural categories as described above, plural representative character code strings are possible for one keyword when the keyword in the retrieval expression is converted into the representative character code string. For example, if the contents of the character code-category correspondence table are as shown in FIG. 15, each of the characters "文" and "像" belongs to two categories "父, 交" and "俱, 場", respectively. In this case, the keyword used in the above example of retrieval expression "文書画像" is converted into four representative character code strings "父家画俱", "交家画俱", "父家画場" and "交家画場". All documents including at least one of those four representative character code strings are extracted and internally processed as the result of OR of these four keywords. By execution of these processes, retrieval can be carried out without oversight though the process time is increased a little.

Moreover, in the case where the plural categories correspond to one character, the certainties of four keywords internally developed can be shown by storing the certainty of categories also. For example, it is assumed that the probability of identifying the character "文" with the categories "父" and "交" is 0.7 and 0.3, respectively, and the probability of identifying the character "像" with the categories "俱" and "場" are 0.8 and 0.2, respectively. In this case, "父家画俱" appears in probability of 0.7×0.8=0.56, "交家画場" in 0.3×0.8=0.24, "父家画俱" in 0.7×0.2=0.14 and "俱俱" in 0.3×0.2=0.06. In this way, by rearranging the developed keywords in the order of certainty, it becomes possible to offer the retrieved document images to the user in the order of certainty. The probability of identification of each character with the corresponding category can be calculated by counting in what rate the characters of the same character type in the unknown character image set used for extending the category are included in the corresponding category.

Next, a second variation of the first embodiment of the document processing apparatus according to the present invention is described. So far it is supposed that there is no error in the phase of character segmentation and each character is securely segmented, but in fact, a lot of errors occur in the character segmentation. In the case where a document includes only Japanese characters, a fixed pitch is expected. However, in the case where some English words or the like are possibly included in it, the Chinese character is often separated incorrectly into a left-hand radical and a right-hand radical if the text is written laterally. Needless to say, it may be assumed that one character is divided into two by reason of blurring of character images caused in scanning.

If there are plural possible character segmentation positions in some characters, representative character code strings, each of which includes the possible segmentation results may be represented. Supposing such a case, representation of the representative character code string as follows is now considered. This is realized by extending the representative character code table described in the first embodiment in the following way.

FIGS. 16(A) and 16(B) illustrate a specific example of the segmentation positions in the case where the plural interpretations of character segmentation are possible. Now it is assumed that the image to be the object of character segmentation process is "文書印刷" as shown in FIG. 16(A). As to "文" and "書", characters are properly segmented because there is no segmentation position other than the space between the characters. However, the character "印" has one candidate for segmentation position which vertically consists of white pixels only, and "刷" has two such candidates. There is of course a segmentation position between these two characters, and consequently total five partial characters (a1, a2, b1, b2, b3) can be obtained from "印刷" as shown in FIG. 16(B).

Integration of the above segmented characters into one characters is attempted. In the integration, the partial characters are processed from the left, wherein any item which does not exceed the threshold value of the width is regarded as a character. As the threshold value of the width, for example, the height of the line h can be used. In this example, there is nothing which can be integrated with the character "文"; therefore, "文" is directly registered as one character. The same is the case with the character "書". Regarding the character "印", two interpretations are possible: one is the case where the partial characters a1 and a2 are regarded as two characters; the other is the case where they are regarded as one character. Integration of a2 with b1 is not accepted because, if they are integrated, the result exceeds the threshold value of the width. Therefore, it is necessary to retain the two interpretations hitherto for the same character image region. In the same way, for b1 and subsequent thereto, four interpretations ([b1], [b2], [b3]), ([b1b2], [b3]), ([b1], [b2b3]) and ([b1b2b3]) are possible. Here, square brackets indicate that the inside partial characters are regarded as one character.

FIG. 17 illustrates relations between the character strings segmented in the case where plural interpretations of character segmentation are possible. That is, relations among the possible interpretations in attempting the integration of partial characters as described above are shown. In the figure, ○ indicates a pause of character segmentation, and □ indicates a unit to be regarded as one character. As mentioned above, a1 and a2 have two interpretations and b1–b3 have four interpretations, and the candidates segmented in accordance with each interpretation are arranged and connected by a line. In this example, total eight interpretations are possible and all of them are retained.

FIG. 18 illustrates an example of the representative character code table in the case where the plural interpretation of segmentation are permitted. To represent the plural interpretations as shown in FIG. 17, the representative character code table is divided into a master table and sub-tables. The master table is made by extending the representative character code table shown in FIG. 13, whereby pointers to sub-tables representing interpretations, if there are plural interpretations of character segmentation, are stored in the column which indicated the position on the image before. If the plural interpretations are possible, the representative character code in the master table is set to zero in FIG. 18. The sub-table consists of right-hand partial character region from a certain position of segmentation, its position in the image, and the sub-table number connecting thereto.

Regarding the character "印" shown in FIG. 16(B), the character segmentation positions are at the left of the partial character a1 and the left of the partial character a2. The numbers are assigned to the sub-tables from the leftmost segmentation position in order. That is, if it is assumed that the left of a1 is the segmentation position, possible interpretations as one character are [a1] and [a1a2]. Because a1 shares the segmentation position of the left of a2, the sub-table number 2 is stored for a1. There is no more characters subsequent to [a1a2]; accordingly, 0 is stored for [a1a2].

Next, the second sub-table is generated for the case where the left of a2 is assumed to be the segmentation position. There is only one interpretation as a character in the right side of the segmentation position, namely, [a2]. Therefore, only [a2] is registered at the second sub-table, and the next table number is set to 0 because there is nothing subsequent thereto.

In the same way, three sub-tables are generated for the character "刷". For the first sub-table, three interpretations [b1], [b1b2] and [b1b2b3] are generated. For the second sub-table, [b2] and [b2b3], for the third sub-table, [b3] is generated. The pseudo character recognition process is carried out for each segmented character and the representative character code is assigned thereto and stored in the column of representative character code in the sub-table. In FIG. 18, the representative character code assigned to each extracted character is represented by the braces { }.

Figure 19:
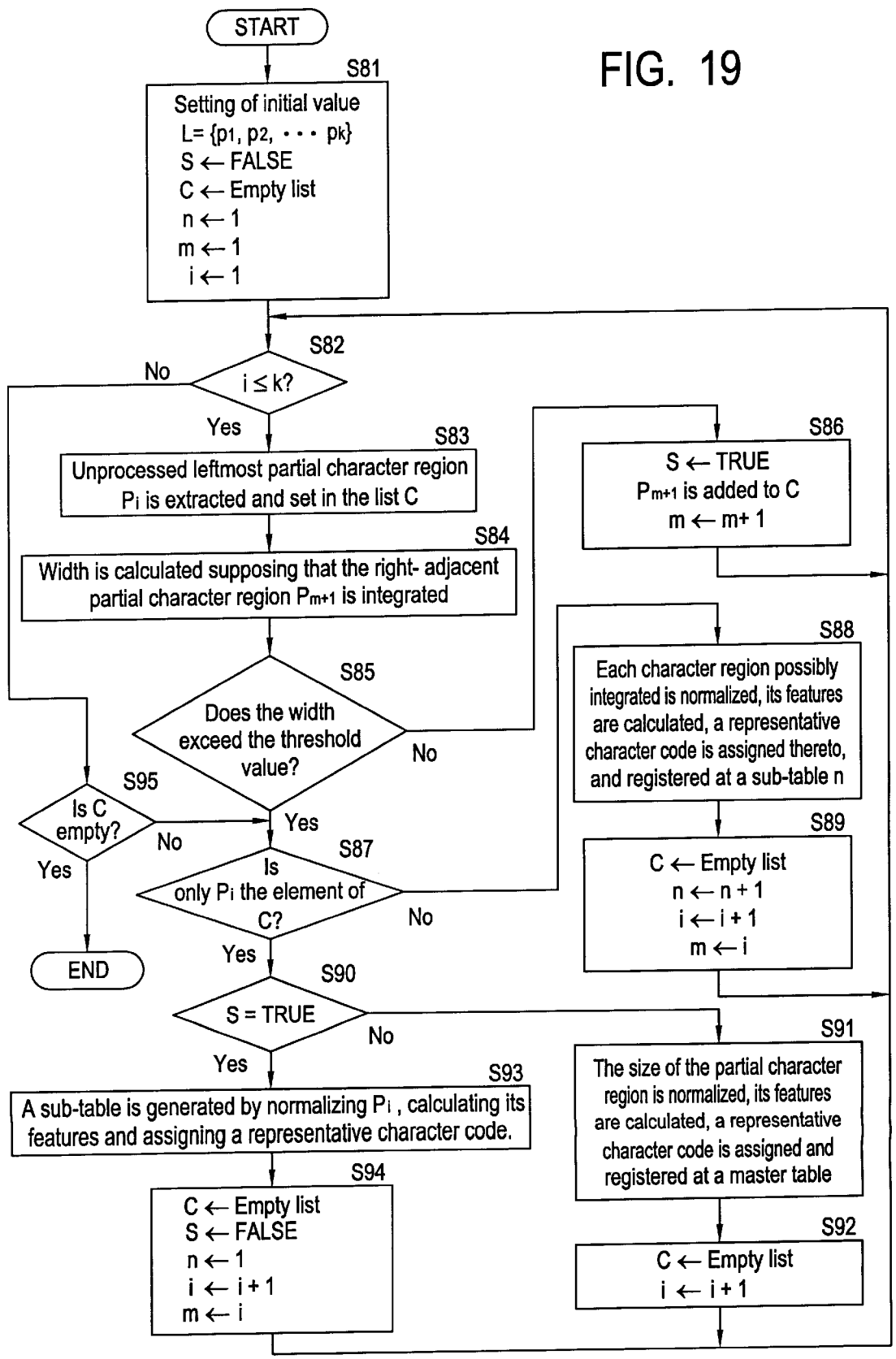
FIG. 19 is a flow chart showing an example of a process of preparing the representative character code table in the case where plural segmentation interpretations are permitted in the second variation of the first embodiment of the document processing apparatus according to the present invention.

FIG. 19 is a flow chart showing an example of process of generating the representative character code table in the case where the plural interpretations of segmentation are permitted, as shown in FIG. 18. At first, in step 81, an initial value is set. The partial character regions to the number of k included in a line are assumed to be $p_1, P_2, \ldots, P_k$, and a variable L is set to its list $\{p_1, P_2, \ldots, P_k\}$. Simultaneously, it is assumed that the partial character regions to the number of k are sorted from the left to the right. The flag S indicating whether or not there are plural interpretations of segmentation now under processing is set to FALSE. Moreover, the list C of partial character regions possible to be integrated into one character is made to be empty. A variable n indicating the current sub-table number, a variable m indicating the position of the partial character string in the course of integration and a variable i indicating the position of the partial character region currently focused are all set to 1.

In step 82, it is examined whether the position of the partial character region which is currently focused reaches the end of the line or not. That is, i and k are compared, and if i≦k, the process proceeds to step 83 where the unprocessed leftmost partial character region $p_i$ is segmented and set on the list C. in step 84, it is supposed that the integration of the partial character region $p_i$ or an integrated partial character region including the partial character region $p_i$ with the right-adjacent partial character region $p_{m+1}$ and the width of the character is calculated assuming that the integration is carried out. In step 85, it is determined whether calculated width exceeds the threshold value or not. If the width does not exceed the threshold value, further integration is possible; accordingly, the flag S is set to TRUE in step 86, $p_{m+1}$ is added to the list C, the variable m is incremented by one and the process returns to step 82. In this case, since only the value of the variable m is changed without changing the value of the variable i, the integration of the partial character regions adjacent to the further right side is to be attempted in step 84. In such a way, the process is repeated until the character width exceeds the threshold value. In step 85, if the integrated character width exceeds the threshold value, the integration attempted at last in step 84 is not carried out, and the process proceeds to step 87. Here, $p_i$ to $p_m$ can be integrated. The list of partial character regions which can be integrated $\{p_i, \ldots, p_m\}$ up to this point are stored in the list C.

In step 87, it is determined whether the element in the list C is only $p_i$ or not, that is, it is determined whether plural partial character regions can be integrated or not. If the elements in the list C is not only $p_i$, plural partial character regions can be integrated, and accordingly, sub-tables are generated based on those partial character regions. In step 88, all possible character regions including the leftmost partial character region are registered at the sub-table of number n in order of the number of partial character regions from the smaller one to the larger one. At this time, the size of each integrated character region is normalized, the feature is calculated, the representative character code is assigned thereto and registered at the sub-table. The next table number is determined by adding the number of partial character regions in the integrated character region to the value of the variable n, and the next table number of the last integrated character region in the sub-table is set to 0. Thus the sub-tables for the integrated character regions beginning with i-th partial character region are generated.

In step 89, the variable i is incremented by one to ready for the process on integrated character region beginning with the next partial character region, and thereby the focus is shifted to the next partial character region. At the same time, the list C is reset to be empty and the variable n indicating the sub-table number is incremented by one, and moreover, the variable m is set to the value of the variable i. Then the process returns to step 82, the integration of the partial character regions are attempted from the next partial character region.

In step 87, if the element of the list C is only $p_i$, the flag S is further examined in step 90. If the flag S is FALSE, $p_i$ is a partial character region having a possibility of an independent character. In step 91, the size of the partial character region $p_i$ is normalized, its feature is calculated and the representative character code is assigned thereto, and registered at the master table. After that, the variable i is incremented by one to reset the list C to be empty for the process of next partial character region. Then the process returns to step 82.

If the flag S is TRUE in step 90, the partial character region $p_i$ is, for example, the rightmost partial character region in the group of partial character regions which can be integrated such as a2 or b3 in the example shown in FIG. 16(B). In this case, in step 93, $p_i$ is normalized, its feature is calculated, and the representative character code is assigned thereto to generate the n-th sub-table. At this time, the next table number is 0. Because the partial character region $p_i$ has no partial character region to the right to be integrated, the sub-tables derived from one entry of the master table are completed. Thereby, in step 94, the variable n indicating the sub-table number is reset to 1. The variable i is incremented by one for processing the next partial character region, and thereby the list C is reset to be empty and the flag S is reset to FALSE. The variable m is set to i. The process returns to step 82 so that the process is started from a partial character region which is newly focused.

When the process proceeds to the rightmost partial character region in the line and is completed, the relation of i and k is i>k. In step 82, if it is determined that the condition is satisfied, further integration process is unnecessary. In step 95, it is determined whether the list C is empty or not. If it is not empty, processes in the step 87 and the subsequent steps are executed on partial character regions left in the list C and the master table or sub-tables are generated. If the list C becomes empty, processes are completed. By such processes, for example, the representative character code table having two-stage structure as shown in FIG. 18 is generated. The generated representative character code table is registered together with the inputted document image.

If the plural interpretations of character segmentation are permitted, the bi-gram table which is an index for retrieval is extended so that it can deal with the plural interpretations of the character segmentation. That is, as to the two characters in the bi-gram table, it is necessary to explicitly notify whether they are one of the plural interpretations of character segmentation or not, and if so, to which interpretation of character segmentation they belong. Therefore, the bi-gram table is extended as follows: in the table of position in the document image stored for each bi-gram table shown in FIG. 12, the document ID and the block ID are left unchanged because they are used in common, but the position of each of the first and second characters is represented by a set of (p, n, m). These p, n and m represent a character position in a block, namely a position in a representative character code table, the sub-table number corresponding to an interpretation of character segmentation and a position in the sub-table, respectively.

Figure 20:
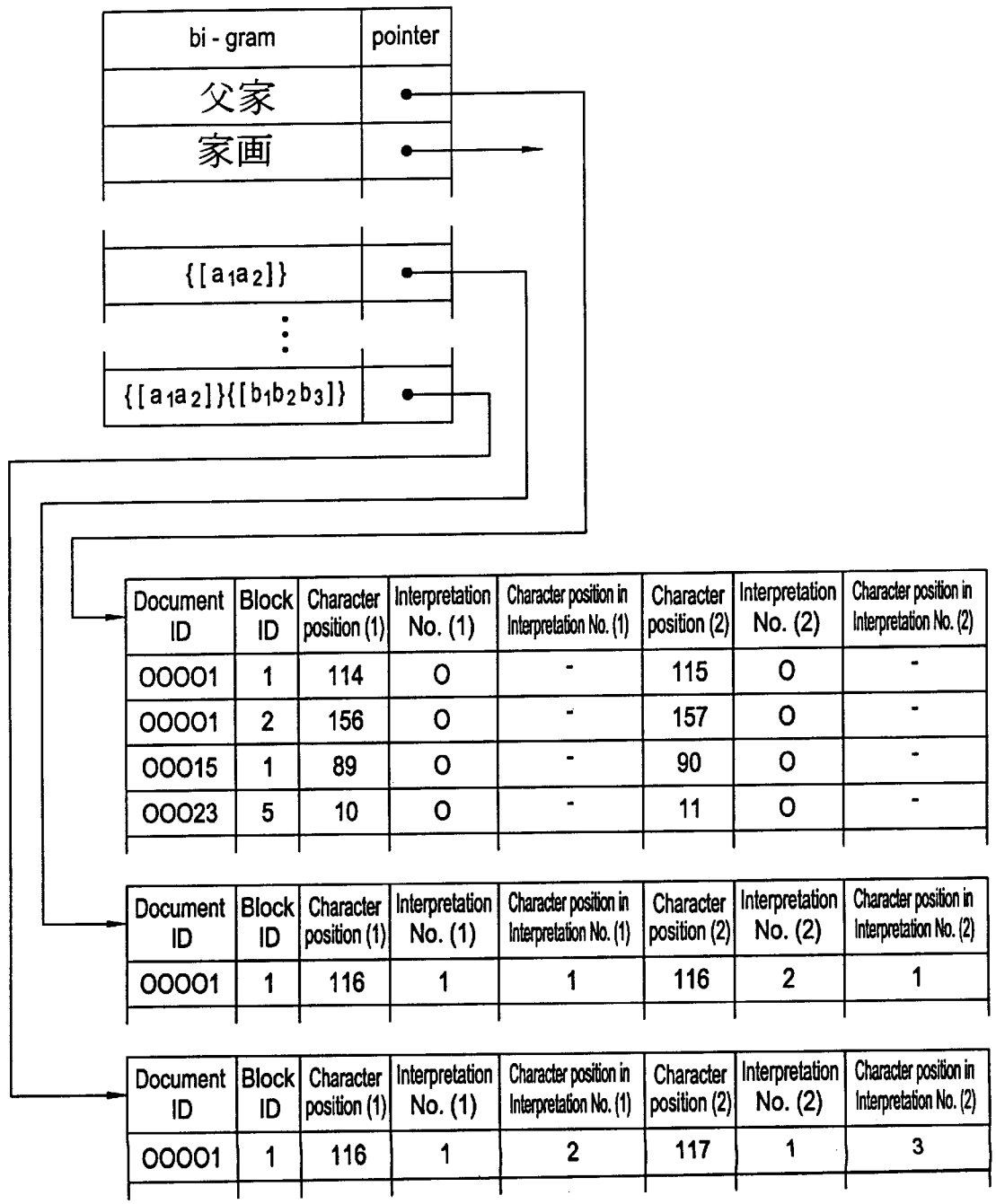
FIG. 20 illustrates an example of a bi-gram table in the case where plural segmentation interpretations are permitted in the second variation of the first embodiment of the document processing apparatus according to the present invention.

FIG. 20 illustrates an example of the bi-gram table in the case where the plural interpretations of character segmentation are permitted. If there is only one interpretation of segmentation, n is set to 0 and m is ignored. This is applicable to the example of the bi-gram "父家" in FIG. 20.

If there are plural interpretations of segmentation and the individual character in the bi-gram is one of them, n and m represent the sub-table number and the position in the sub-table, respectively. In the example of plural candidates of character segmentation of "印刷" shown in FIG. 16, for instance, the character positions corresponding to the bi-gram {[a1]} {[a2]} generated by dividing the character "印" into two parts are (116, 1, 1), (116, 2, 1), and the character positions of the bi-gram {[a1a2]} {b1b2b3} generated by correctly segmenting "印" and "刷" are stored as (116, 1, 2), (117, 1, 3). Thus the bi-gram table generated based on the representative character code strings in the inputted document image is registered to be used in the retrieval.

When the retrieval is executed, it is possible to generate the bi-gram of the representative character code string for the keyword in the inputted retrieval expression in the same way as the case of the document image, and retrieve it from the registered bi-gram table. Because the keyword is inputted by the keyboard 3, for example, the retrieval executing element 13 receives it as a character code, and accordingly, there are no plural interpretations of segmentation position, and only one segmentation position is determined. In the bi-gram table generated from the document image, a bi-gram in the case of correctly segmented character is also registered; therefore, matching with such bi-gram of the correct segmentation case is detected in the retrieval.

As described above, as to the keyword having three characters or more, it is necessary to determine whether the bi-grams successively exist in the same document or not. Now, if it is to be determined, whether these two bi-grams have the same document ID and the same character block ID or not, and whether (p, n, m) representing the position of the last character of the former bi-gram is the same as the position of the first character of the bi-gram desired to be determined whether it follows immediately or not should be examined. If the two bi-grams have the same document ID and the same character block ID, and moreover, (p, n, m) of the last character of the former bi-gram is the same as the position of the first character of the latter bi-gram, they are determined to be successive.

It is possible to combine the construction in the case where classification into plural categories is permitted as described in the first variation and the construction in the case where plural interpretations of character segmentation exist as described in the second variation.

Second Embodiment

Next, the second embodiment of the document processing apparatus according to the present invention is explained. As described above, in the first embodiment, there is a possibility of retrieving a character string such as not acceptable as a word in a document because the character string to be searched is converted into a string of a similar character category, and thereby the retrieval is executed by simple matching. The object of the second embodiment is to prevent to retrieve a document including such a character unacceptable as a word and improve the precision of the retrieval.

Figure 21:
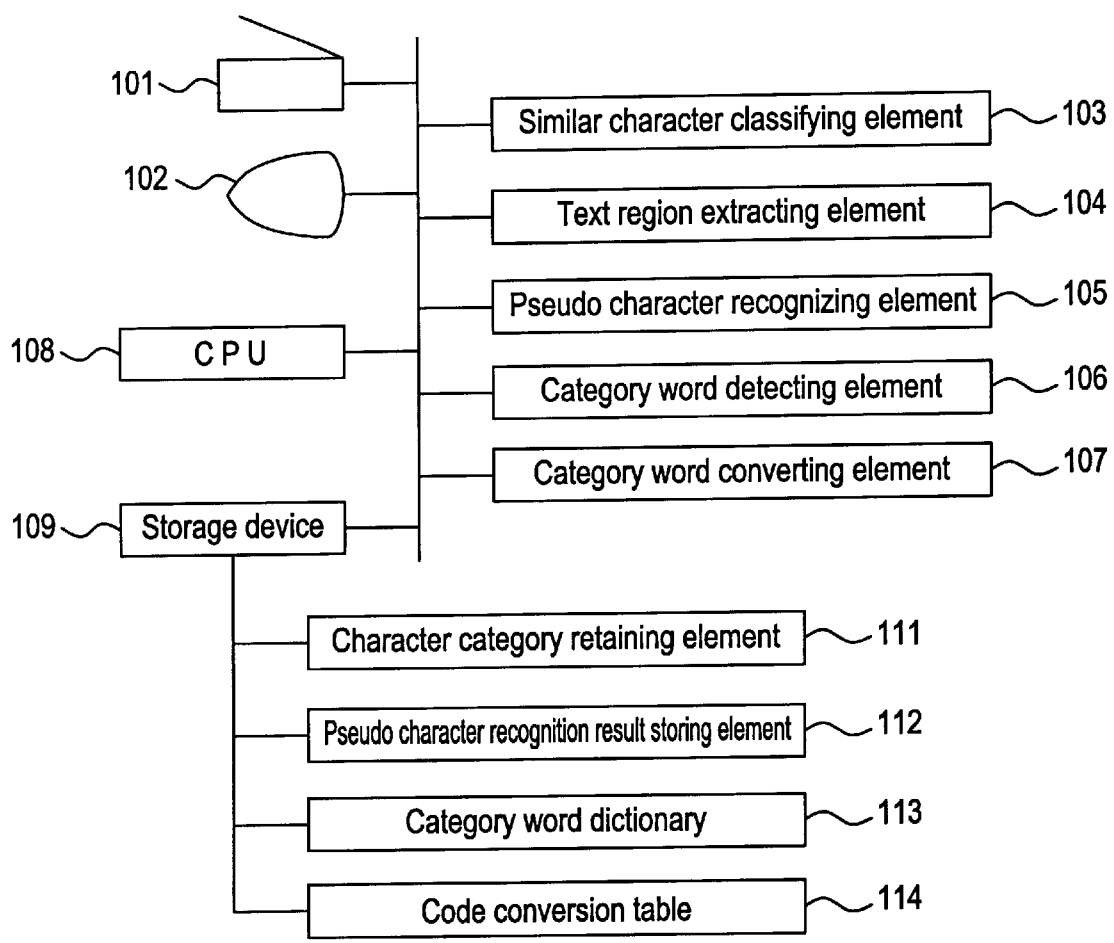
FIG. 21 shows the construction of a second embodiment of the document processing apparatus according to the present invention.

FIG. 21 shows a construction of the second embodiment of the document processing apparatus according to the present invention. Elements corresponding to elements of the first embodiment have the same reference numbers as those of the first embodiment, and the explanations are omitted.

An image inputting element 101 may be the scanner 5 shown in FIG. 1, for example, and reads the document as an image. An image displaying element 102 may be the display 2 shown in FIG. 1, for example, and displays the inputted image or confirmation of a result of the process. A similar character classifying element 103 is the same as the similar character classifying element 11 in FIG. 1, and classifies object characters into categories consisting of similar characters based on the image feature. A text region extracting element 104 constitutes the function of a part of the pseudo character recognizing element 12 in FIG. 1, which extracts a text region in the document image, and further extracts the image per every character. A pseudo character recognizing element 105 constitutes the function of another part of the pseudo character recognizing element 12 in FIG. 1, which classifies the character images into the appropriate similar character categories and assigns representative character codes thereto. A category word detecting element 106 extracts a representative character code string which constitutes a word from the group of representative character code strings. A category word converting element 107 converts the category word into characters. A CPU 108 controls the whole apparatus.

A storage device 109 includes the external storage device 7 shown in FIG. 1 and also stores a character category retaining element 111, a pseudo character recognition result storing element 112, a category word dictionary 113 and a code conversion table 114. The CPU 108 stores the program for controlling the whole apparatus. The character category retaining element 111 stores the categories classified by the similar character classifying element 103 and corresponding image feature. For example, the character category retaining element 111 stores the similar character category table, character code-category correspondence table and so forth. The pseudo character recognition result storing element 112 retains the representative character code string converted by the pseudo character recognizing element 105. The category word dictionary stores at least the representative character code strings constituting a word and the relation of correspondence between the word and part of speech. In some cases, a character word consisting of at least one character represented by the representative character code string is retained. Moreover, a part of speech connection dictionary which shows the relation of connection between the words is also retained. The code conversion table 114 records the correspondence between the representative character code string representing a word and a character string. In the case where the character words are retained corresponding to the category words in the category word dictionary, it is possible to replace the code conversion table 114 with the category word dictionary 113.

The details of each process are described as follows. The process in the similar character classifying element 103 is the same as that of the first embodiment; therefore the explanation is omitted here. The similar character category table and the character code-category correspondence table generated by the similar character classifying element 103 are retained in the character category retaining element 111. It is unnecessary for the similar character classifying element to execute parsing per every process if once the feature to be parsed is determined; accordingly, it is possible to execute parsing in another device and only the result is stored in the character category storing element 111 to be used. The character category storing element 111 stores the similar character category table, for example, specifically, as shown in FIG. 6 and the character code-category correspondence table, for example, as shown in FIG. 7.

Figures 22, 23:
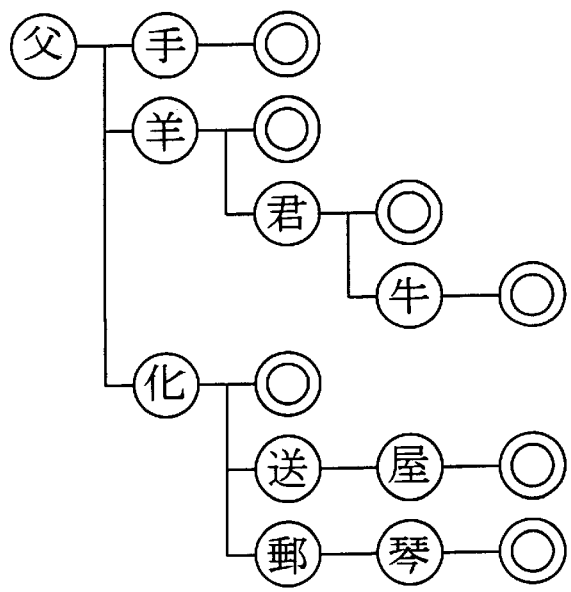
FIG. 22 illustrates an example of a category word dictionary in the second embodiment of the document processing apparatus according to the present invention.
FIG. 23 illustrates another example of the category word dictionary in the second embodiment of the document processing apparatus according to the present invention.

The category word dictionary 113 and the code conversion table 114 can be generated by replacing the character codes of the conventional word dictionary with the representative character code string by utilizing the similar character category table and the character code-category correspondence table stored in the character category storing element 111. FIG. 22 illustrates an example of the category word dictionary in the second embodiment of the document processing apparatus according to the present invention. In this example, the representative character code string indicating a word, part of speech of the word indicated by the representative character code string, and a character string of the word indicated by the representative character code string are related to one another. Some of the conventional dictionaries store a character word and the corresponding part of speech in a pair. In such a case, by obtaining the representative character code string corresponding to the character word and rearranging them, the category word dictionary 113 such as shown in FIG. 22 is available. In the category word dictionary 113, for the representative character code string indicating a word, particularly, as to a word which conjugates, not only a stem of the word but also a suffix is stored separately. Further, as described later, the category word dictionary 113 includes a part of speech connection dictionary which shows the relation of connection between the stem and the suffix, and moreover, an auxiliary verb, a postpositional particle or the like subsequent thereto. Otherwise, it may be possible to store all conjugation forms.

FIG. 23 illustrates another example of the category word dictionary in the second embodiment of the document processing apparatus according to the present invention. The category word dictionary 113 may be represented in various forms other than the form of the table showing the relation among the representative character code string, word represented by the character code and the corresponding part of speech as shown in FIG. 22. For example, the category word dictionary 113 can be constructed in the form shown in FIG. 23 so as to efficiently execute the matching process. The category word dictionary 113, for example, uses "trie" which is introduced by "Trie and its Application", Aoe, Information Processing, Vol. 34, No. 2, February 1993, and constructs the trie so that all category words beginning with each representative character code are stored. It has the structure such that the category word can be extracted by traversing the nodes to the terminal node. In FIG. 23, the terminal nodes are represented by the symbols ⊙.

The example shown in FIG. 23, the category word dictionary 113 is illustrated, which can be used for matching the following seven words, "文字", "文学", "文学者", "文学青年", "文化", "文化遺産", and "文化勲章". The representative character code strings generated by converting the seven words are as follows: "父手"; "父羊"; "父羊君"; "父羊君牛"; "父化"; "父化送屋" and "父化郵琴". These strings are represented by trie as shown in FIG. 23. Characters in a character string is matched one by one from the top of the string with the category word dictionary 113, and the character string that can be reached to the terminal symbol ⊙ is accepted as a word and outputted. FIG. 23 shows the trie which executes matching about the above seven words only, but actually, the trie is generated by converting the all words into the representative character code strings to be the category word dictionary 113. The corresponding information such as parts of speech or the character words may be connected to the terminal symbols. Otherwise, the table as shown in FIG. 22 and the trie dictionary as shown in FIG. 23 may be held together. Needless to say, a category word dictionary 113 by the other data structure may be available.

FIG. 24 illustrates an example of the code conversion table of the second embodiment of the document processing apparatus according to the present invention. The code conversion table 114 particularly pairs the representative character code string with the word corresponding thereto and stores them. Here, the information about the part of speech is also added. The data held in the category word dictionary 113 and the code conversion table 114 are almost the same; therefore, the data are shared in the actual processing. However, here the data are separately dealt with to simplify the explanation.

The processes described above are carried out for preparation of the data necessary to segment the words from the document image. Accordingly, it may be possible to carry out the above processes by another apparatus and prepare the similar character category table, character code-category correspondence table, category word dictionary 113 and the code conversion table 114 in advance, and thereby only the relevant data may be used.

Now the document registration process is described. The text region extracting element 104 parses the binary-value digital image inputted through the image inputting element 101 to segment the character region, and moreover segments each character. The process of the text region extracting element 104 is the same as a part of the pseudo character recognizing element 12 in the first embodiment, namely, processes in steps 51 and 52 in FIG. 8; therefore the explanation is omitted here.

The pseudo character recognizing element 105 executes the process per every character region segmented by the text region extracting element 104. The process in the pseudo character recognizing element 105 is the same as a part of the pseudo character recognizing element 12 in the first embodiment, namely, processes in step 53 and the steps subsequent thereto in FIG. 8, except for the registration process to the bi-gram table in step 54.

The pseudo character recognizing element 105 converts the each character image segmented by the text region extracting element 104 into the representative character code of the similar character category. This process is the same as that shown in FIG. 10; accordingly, the explanation is omitted. The obtained representative character code strings are stored in the pseudo character recognition result storing element 112 per character block together with the position in the image and the inputted image. For example, as shown in FIG. 13, the representative character code and the position of the rectangle which occupies in the image represented by (top-left x-coordinate, top-left y-coordinate, width, height) can be stored.

Figure 25:
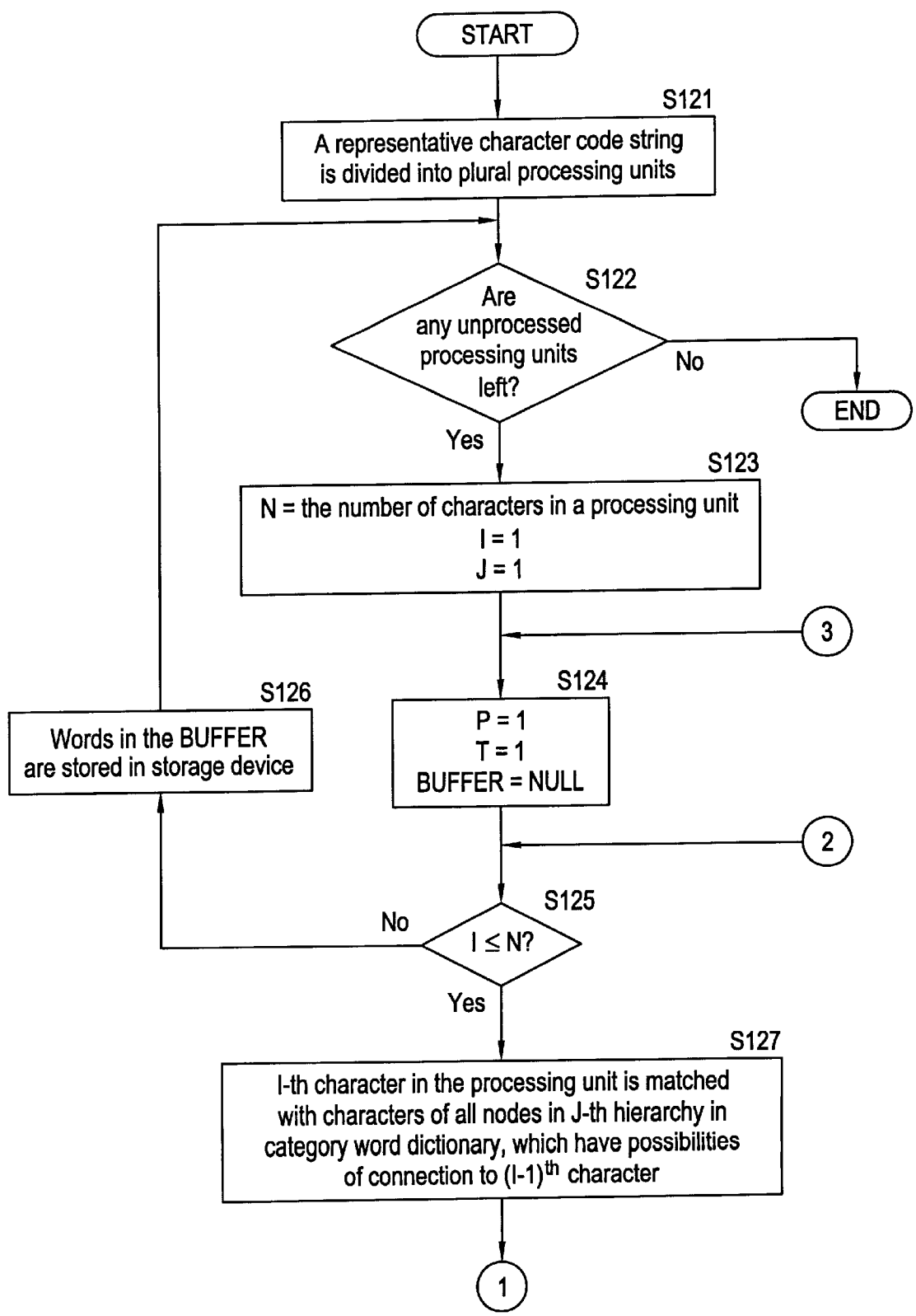
FIGS. 25 and 26 are flow charts showing an example of operation of a category word detecting element in the second embodiment of the document processing apparatus according to the present invention.
Figure 26:
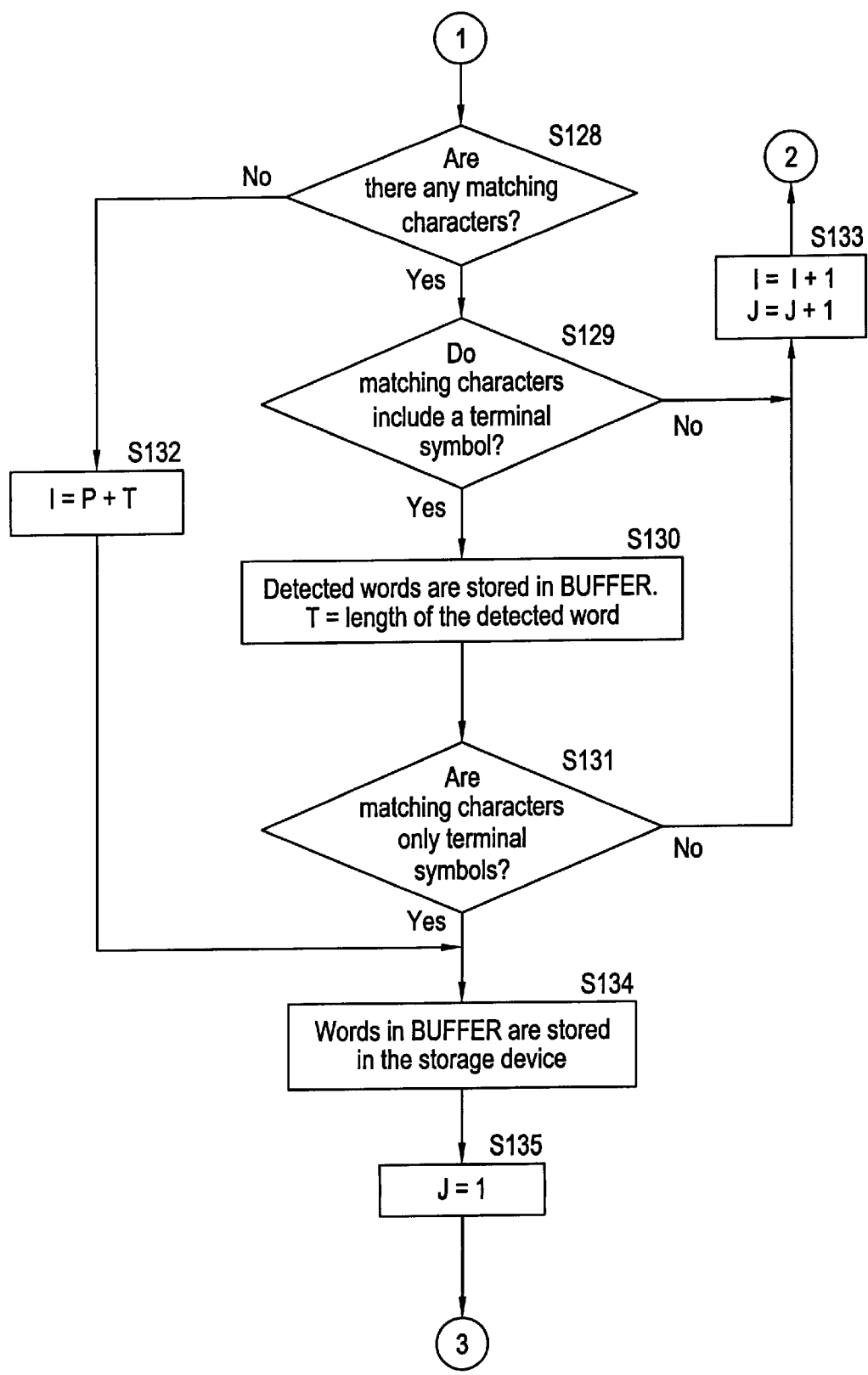

The category word detecting element 106 executes matching of the representative character code strings stored in the pseudo character recognition result storing element 112 by the pseudo-character recognizing element 105 with the category word dictionary 113, and extracts the representative character code strings which are accepted as the words. FIGS. 25 and 26 are the flow charts showing an example of operation of the category word detecting element in the second embodiment of the document processing apparatus according to the present invention. Here it is assumed that the category word dictionary 113 has the data structure of trie shown in FIG. 23.

First, in step 121, the punctuation marks detected by the pseudo character recognizing element 105 are again detected from the category character string, and a representative character code string from a character of the top of the line to a punctuation mark or a representative character code string between the punctuation marks is regarded as one processing unit, whereby the representative character code strings stored in the pseudo character recognition result storing element 112 are divided into plural processing units. Then the divided processing units are processed in order.

In step 122, it is determined whether the unprocessed processing units are left or not, and if all processing units have already been processed, the process in the category word detecting element 106 is completed. If there are any processing units left unprocessed, in step 123, one of the unprocessed processing units is specified and the value of the variable N is set to the number of characters in the unit, and the values of both of the variables I and J are set to 1. The variable I indicates the processing object character in the processing unit, and the variable J indicates the hierarchy of the node in the trie in the category word dictionary 113. In step 124, the value of the variable I is substituted for the variable P and the value of the variable T is set to 1, and a region BUFFER is cleared to be NULL. The variable P indicates the position of the character at which the word detection is newly started in the specified processing unit, and the variable T indicates the number of characters newly detected word. The detected words are stored in the region BUFFER in order.

In step 125, it is determined whether all characters in all the specified processing units have been processed or not by examining whether the variable I is within the range of the variable N or not. If there are any characters which are unprocessed, the attempt of matching the I-th character in the specified processing unit with all nodes which have possibility of connection to the (I–1)-th character in the. processing unit among all nodes in J-th hierarchy in the category word dictionary 113 is executed in step 127. The terminal symbol is regarded as "wild card" which matches with all characters. In step 128, it is determined whether the matching character exists or not. If there is no matching character, the character string before the I-th character is not accepted as a word, and consequently, matching attempt is executed again from the character next to the character at which the preceding word matching was started. That is, in step 132, the number of characters newly detected as a word and stored in the variable T is added to the position of the character at which the word detecting is started stored in the variable P, whereby the position of the character at which the next matching is started is calculated and substituted for the variable I. Further, in step 134, the words having been detected and stored in the region BUFFER are transferred to be stored in the storage device 109, and in step 135, the variable J is set to 1 so that the matching is started from the top of the category word dictionary 113, and then the process returns to step 124. In step 124, the value of the variable I is substituted for the variable P to avoid newly starting word detection from the same position. Thus the process is continued to newly detect a word.

If the characters attempted to match in step 128 exist as the nodes having possibilities of connection to the (I–1)th character in the processing unit in the J-th hierarchy of the category word dictionary 113, it is further determined in step 129 whether the detected matching characters include the terminal symbol or not. If the terminal symbol is included, there is a possibility that a word exists before the character position indicated by the variable I; therefore, in step 130, the detected word is stored in the region BUFFER and the word length is stored in the variable T.

The number of characters matched in the matching attempt in step 127 is not limited to one: for example, there is a case where both of a certain character and a terminal symbol are matched. In step 131, it is determined whether the matching characters are only the terminal symbols or not, and if they are only the terminal symbols, there is no matching character having more length in the category word dictionary 113. Therefore, in step 134, the words having been detected and stored in the region BUFFER up to this point are transferred and stored in the storage device 109, and in step 135, the value of the variable J is set to 1 for detecting a new word. Then the hierarchy is reset to the top of the category word dictionary 113, and the process returns to step 124. In step 124, the value of the variable I is substituted for the variable P to avoid newly starting detection of a word from the same position. Thus the process continues to newly detect a word.

If it is determined in step 129 that the matching characters do not include the terminal symbol, or, if it is determined in step 131 that the matching characters are not only the terminal symbols, each value of the variables I and J is incremented by one to execute next character matching in step 133, and then the process returns to step 125.

By repeating such processes, whenever a terminal symbol appears, a word is detected and stored in the storage device 109. In step 125, it is confirmed that the processes for all characters in the specified unit are completed, and the words stored in the region BUFFER are transferred and stored in the storage device 109, thus the processes for the processing unit are completed. In the case it is determined that there is a processing unit left unprocessed, the unprocessed unit is selected and the matching attempt is carried out for the characters one by one as described above for detecting the words. If the processes are competed for all of the processing units, the process in the category word detecting element 106 is completed.

As a specific example, the case of matching of the representative character code string "文化送琴" as the processing unit by utilizing the trie shown in FIG. 23 is now considered. At first, matching of "文" is attempted and it succeeds, and then next matching of "化" is carried out. Then attempt of matching is carried out as to the representative character codes "手", "羊" and "化" in the second hierarchy of the trie, all of which have possibilities of connection to "文". As a result, "化" succeeds in matching. Since the matching representative character code is not the terminal symbol, the matching of the next representative character code "送" is further attempted. That is, among the representative character codes in the third hierarchy, the matching with "送", "郵" and the terminal symbols which have possibilities of connection to "化" is executed. In this case, the terminal symbol and "送" are matched. Because the terminal symbol is included, "文化" is detected as a word and stored in the region BUFFER. However, the representative character code is not only the terminal symbol, and therefore the matching process is continued. The matching of the next representative character code "琴" with "屋" in the representative character codes in the fourth hierarchy, which has a possibility of connection to "送", is attempted. However, since the representative character codes do not match with each other, the word "文化" in the region BUFFER is transferred and stored in the storage device 109.

The next word matching is started with "送" which is subsequent to the detected category word "文化". Such processes are continued to execute to the last character of the processing unit, and further executed until no unprocessed unit is left. According to these processes, all category words which exist in the category word dictionary 113 and appear in the document can be stored in the storage device 109.

Generally, the same words appear plural times in a document, and consequently, the same category words are redundantly stored in the storage device 109. The redundant category words may be retained, or may be deleted except one. The pseudo character recognition result storing element 112 stores the representative character codes and information of positions thereof in the image for the case where the position of appearance of the word is desired to be known. However, if redundancy is to be excluded, the pseudo character recognition result storing element 112 may be constructed so that the plural pieces of positional information are stored corresponding to one word. As a method of displaying the positions of appearance of words by utilizing the positional information, various techniques publicly known which can be adopted; therefore detailed explanation is omitted here.

According to the processes described so far, the category words represented by the representative character codes can be extracted. However, those processes are merely detection of the words entered in the word dictionary, and there is no guarantee that the extracted words are accepted as well-formed Japanese words. For example, a compound noun might possibly be extracted by incorrectly separating at a position which is different from the border between the original nouns, or a word accompanied by an incorrect suffix or postpositional particle might be extracted. Such ill-formedness as the particular language (Japanese) is corrected by verifying the possibility of connection between the words in view of part of speech.

For example, if a Japanese sentence "将来＼実現される技術である" is represented by a representative character code string, it turns to be, for instance, "均糸芸温される転術である○". If the detection of the category words as described above is also carried out for a processing unit specified therefrom "芸温される転術である", for example, a category word "芸温" is detected from the category word dictionary 113, and "さ" and "れる" are further detected. The category word "芸温" includes the character words "実現 差損" and "さ". "さ(sa)" includes "さb(sa)" (a suffix of the sa-row irregular verb, a detailed part of speech in Japanese particular grammar) and "き(ki)" (a stem of the lower Indian verb, also a detailed part of speech in Japanese particular grammar). However, taking the context into consideration, it is incorrect that a verb having a stem "き" follows the noun "実現" or "差損" according to the Japanese particular grammar. Besides, the noun "差損" is never followed by a causative auxiliary verb according to the Japanese particular grammar, too. Therefore, the interpretation for combination of the words "実現" and "さ" is correct. Similarly, the combination of "さ" and "さ" is also correct. In this case, actual parts of speech are the sa-row irregular verb "実現する" and the causative auxiliary verb "れる".

The errors in the word extraction as described above also occur in parsing of the ordinary character string, but it can be said that such errors frequently occur in dealing with the representative character code string which has more indefiniteness. Thereby, the precision of word extraction can be improved by verifying the possibility of connection to the previously detected word whenever a new word is detected.

For the verification as described above, the part of speech connection dictionary stored in the category word dictionary 113 can be used. FIG. 27 illustrates an example of the part of speech connection dictionary in the second embodiment of the document processing apparatus according to the present invention. The part of speech connection dictionary shown in FIG. 27 indicates the relation of connection between the parts of speech of successive two words. Parts of speech of the former word are entered in the row and those of the latter word are entered in the column of a table. The values of the table indicates:

$L_{ij}=1$; part of speech in the row $_i$ can be followed by part of speech in the column $_j$ $L_{ij}=0$; part of speech in the row $_i$ cannot be followed by part of speech in the column $_j$ Whenever a category word is detected, the relation of connection between the words is verified by utilizing the part of speech connection dictionary as shown in FIG. 27, for example.

However, the category word has a possibility of representing plural character words by one representative character code string. Accordingly, in the actual processing, the verification of possibility of connection is executed regarding all parts of speech of the plural character words corresponding to the representative character code string extracted as a word. If the possibility of connection is verified for only one part of speech, the representative character code string is accepted as a word.

Figure 28:
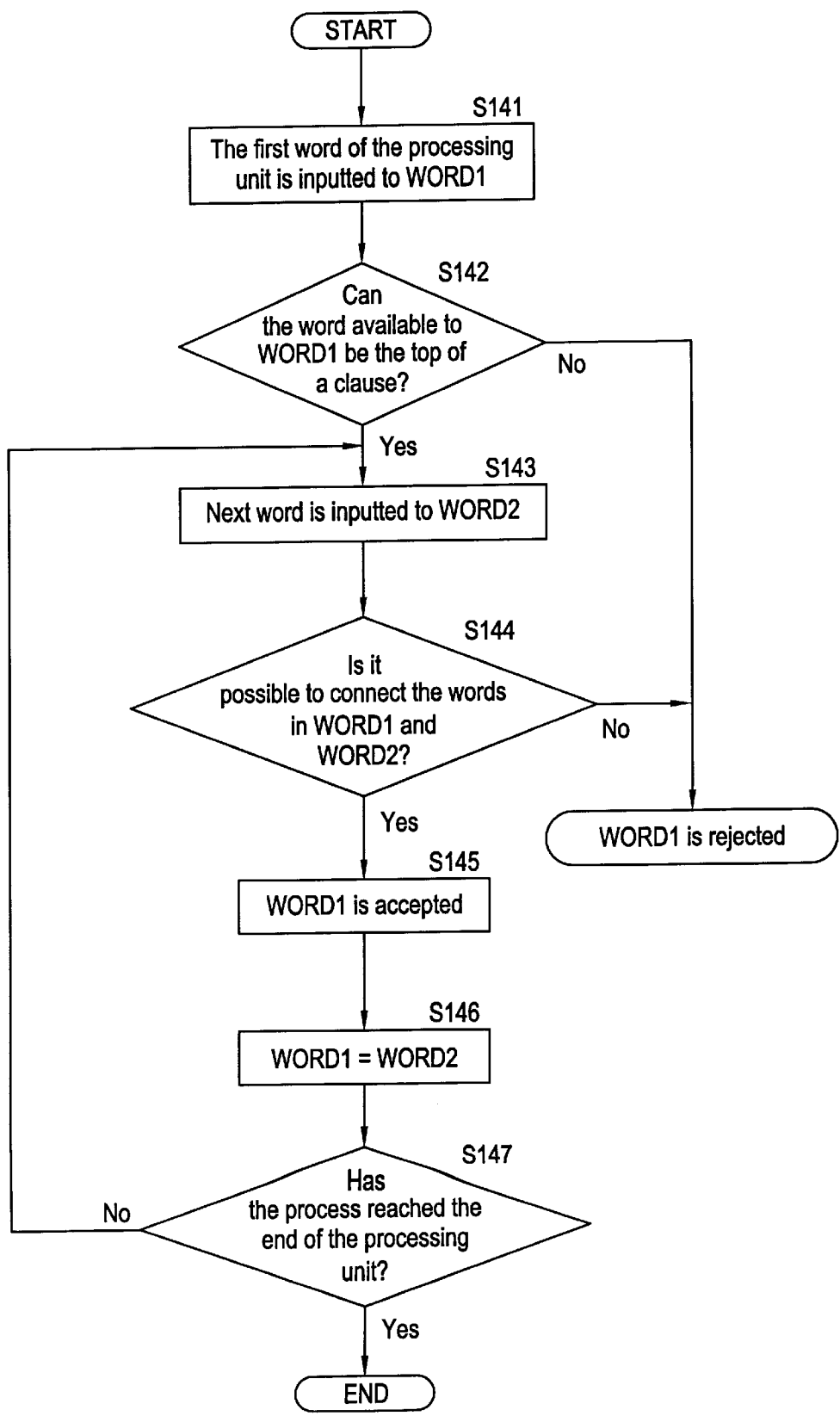
FIG. 28 is a flow chart showing an example of a process of verifying relation of part of speech connection in the second embodiment of the document processing apparatus according to the present invention.

FIG. 28 is a flow chart showing an example of verification process for the relation of part of speech connection. In this process, whenever the category word is detected by the category word detecting element 106, it is inputted and the possibility of connection between words is verified in view of part of speech. First, in step 141, the category word first detected in the processing unit is inputted and substituted for a variable WORD1. In step 142, it is examined whether any part of speech available to the category word is able to be the top of the clause or not. If the category word does not include a word of part of speech able to be the top of the clause, the category word cannot be acceptable as Japanese; therefore, the representative character code string is rejected as a word.

If it is determined in step 142 that the category word can be the top of the clause, the next category word is inputted from the processing unit in step 143 and stored in a variable WORD2. In step 144, the possibility of connection between two category words stored in the variables WORD1 and WORD2 is obtained by searching the part of speech connection dictionary as shown in FIG. 27. If there is no combination of parts of speech which has the relation of connection therebetween among all parts of speech available to the two category words, the first category word stored in the variable WORD1 cannot be accepted as Japanese, and consequently the first word is rejected. If there is any combination of parts of speech which has the relation of connection therebetween among all combinations of parts of speech available to the two category words, the first category word stored in the variable WORD1 is accepted as a well-formed word. Further, in step 146, the category word stored in the variable WORD2 is transferred to the variable WORD1. In step 147, it is determined whether the process has reached the end of the processing unit or not, and if the process has not reached the end, the process returns to step 143, where the rest of the category words are inputted in order for verification of the possibilities of connection between words in view of parts of speech in the same way.

The category word accepted in step 145 will be able to be processed more precisely by the category word converting element 107 later by storing with which part of speech the category word is accepted in step 145 in the storage device 109. If a category word is rejected as a word, the process returns to the top character of the clause now under processing, and the word extraction by the category word detecting element 106 is carried out again to extract another candidate of the word.

The flow of the above-described processes is now described with a specific example. With the previously used example "将来＼実現される技術である⚪︎", how the parts of speech in the clause "実現される" are determined is explained. First, the characters in the representative character code string "芸温される" are attempted to be matched with the category word dictionary 113 from the top in order, and a representative character code string "芸温" having a possibility of a word is obtained. According to the contents of the category word dictionary 113 shown in FIG. 22, there is a possibility that this representative character code is any of the words as follows: "差損" (noun), "実現" (noun) and "実現" (a stem of the sa-row irregular verb). The representative character code string next detected is "さ" having a possibility of being "さ" (a suffix of the sa-row irregular verb, indicating mizen form) or "き" (a stem of the lower Indian verb). With reference to the part of speech connection dictionary shown in FIG. 27, neither relation of connection (noun)—(a suffix of the sa-row irregular verb) nor (noun)—(a stem of the lower Indian verb) exists; therefore, at this point, the first representative character code string "芸温" having a possibility of a word turns out to be "実現" (a stem of the sa-row irregular verb). Accordingly, the representative character code string "芸温" is accepted as the category word.

The representative character code string detected next is "れる" (auxiliary verb), which is capable of connecting to a suffix indicating the mizen form according to the part of speech connection dictionary shown in FIG. 27. Therefore, the representative character code string "さ" is determined to be the suffix of the sa-row irregular verb and accepted as the category word. Further, the representative character code string "れる" is also accepted as the category word because the auxiliary verb can be the end of a clause with reference to the part of speech connection dictionary shown in FIG. 27. Thereby the representative character code string "芸温される" is accepted as one clause, and a stem of the sa-row irregular verb "実現" is detected as an independent word (namely, a word which can constitute a clause by itself).

If the segmentation positions of the words are incorrect and thereby the verification of the possibility of connection in view of part of speech is impossible, the process returns to the top of the clause now under processing, and the verification of the possibility of connection in view of part of speech is executed again after the change of the segmentation positions. According to the above method, the words can be extracted while keeping the correct border between the original words in a compound noun or a possibility of connection between the words in well-formedness as a particular language.

By the processes as described above, the category words having the relation of connection at least accepted as Japanese can be detected. Next, the accepted category words are converted into the words constituted by corresponding characters. This process is carried out in the category character converting element 107 by utilizing the code conversion table 114. The process is very simple. The category words accepted as the words are searched in the code conversion table 114 and all available character words corresponding to each of the category words are outputted. However, because the words used for searching are the independent words, only the words regarded as the independent words in the preceding verification process of the relation of connection in view of part of speech are outputted. Thus the words effective to the retrieval are obtained, and moreover, it is possible to restrain the number of words to be outputted.

As described so far, word extraction from the document image can be carried out without using the process which requires much computation cost as the usual character recognition process. Because the verification of relation of connection in view of part of speech has been executed, ill-formed words are not included in the extracted words. Therefore, if these words are used for retrieval, it is expected that the result of retrieval will have high precision. In this second embodiment, the representative character code string is converted into the character code string by the category word converting element 107, and therefore the retrieval can be executed directly by the character code string without converting the keyword in the retrieval expression into the representative character code string as shown in the first embodiment.

Now a first variation of the second embodiment of the document processing apparatus according to the present invention is described. Similar to the first variation of the first embodiment, the precision of conversion of the character image into the representative character code by the pseudo character recognizing element 105 is improved in this example. In the above-described example, the first variation of the first embodiment, the minimum distance identification method which selects the nearest features in the feature space for assigning the representative character code of each similar character to the character image as shown in step 65 in FIG. 10 is used. However, in many cases, the actual features of the character image varies by blurring or distortion of the image, and thereby the clusters of the similar characters complexly overlap with each other. In such a case, the minimum distance identification method has a strong possibility of identification error.

FIG. 29 illustrates an example of identification error of the representative character code. For example, a case where two clusters a1 and a2 exist in a certain space of two-dimensional features as shown in FIG. 29 is considered. An unknown character x is originally belongs to the cluster a1. However, according to the minimum distance identification method, the unknown character x is determined to belong to the nearest cluster a2. Such identification error occurs as well in the case where the two clusters overlap with each other and the feature of the unknown character x exists in the common portion of two clusters.

For resolving the identification error problem, in the first variation of the first embodiment described above, one character type is registered to the plural similar character categories by utilizing the ε-component extension method. If the category word dictionary 113 is generated based on the similar character category table prepared according to the above-described way, plural different representative character code strings represent the same single character word because one character type belongs to the plural categories. For example, if the character "する" is registered to the category "する", and the character "像" is registered to the categories "倶" and "根", the word "画像" is represented by two representative character code strings "画倶" and "画根". In this way, if one character word correspond to the plural different representative character code strings, the size of the category word dictionary 113 is increased as a result. The increase of the dictionary size of the category word dictionary 113 causes a complexity in the construction of the category word dictionary 113, and besides, provides bad influence on the word extraction speed.

Therefore the similar character classifying element 103 uses the minimum distance identification method here to generate the similar character category table 41 and category word dictionary 113 which is as same as before, but in the identification process in the pseudo character recognizing element 105, the Euclid's distance between the feature of the inputted character image and the category representative vector of each similar character category is calculated, and the categories having distances within a range from the minimum to the N-th one are regarded as the character categories of the inputted characters, and thereby the representative character codes are outputted. However, a threshold value Dt is set to the distance so that the character categories which have a distance longer than the threshold value Dt are not adopted as character categories of the inputted characters, thus it is possible to limit the character categories corresponding to one character type.

FIGS. 30 (A) and (B) illustrates an example of conversion into the representative character code string in the case where N=2 in the first variation of the second embodiment of the document processing apparatus according to the present invention. As the example, a case where the character string "自然言語処理" is converted into the representative character code string by the above-described method is taken. Here, it is assumed that N=2. Moreover, it is also assumed that only the similar character category locating at the minimum distance within the threshold value Dt exists for the character "語".

The representative character code string converted in the case of N=1, namely, the minimum distance identification method, is "自滅豆 記肋喫". For example, it is assumed that the character "言" is not included in the category of the representative character code "豆" of the third character. In this case, the character string "自然言語処理" cannot be reproduced from the representative character code string "自滅豆 記肋喫".

Next, the representative character code string corresponding to N=2, namely, the category which has the next minimum distance within the threshold value Dt, is obtained. Thereby, for the characters "自", "然", "言", "吉" and "恩", the representative character codes "吉", "近", "均", "言" and "言" are obtained, respectively. If the character "言" is included in the category of the representative character code "吉" obtained as described above, it becomes possible to reproduce the character string "自然言語処理".

In this way, the word is extracted in the category word detecting element 106 from the category character string constituting one or more representative character codes obtained for one character. The process in the category word detecting element 106 attempts to match all representative character codes with the category word dictionary 113 and stores the representative character codes accepted as the words in the storage device 109, without changing the above-described method. That is, the representative character code "自" or "吉" is adopted as the first character, and then the matching is attempted as to whether the representative character code "吉滅豆" or "近" is subsequent thereto as the second character or not. In this way, the matching attempt is continued until the terminal symbol is detected. If the terminal symbol is detected, the representative character code strings which have been detected are stored in the storage device 109 as the category words. In the course of the process, plural category character strings are generated, but at the point where no subsequent character exists, the representative character string may be rejected.

For instance, in the matching process up to the second character, it is assumed that there are three word candidates "自恩", "自滅" and "吉滅". Here, the terminal symbol is detected in the category word dictionary 113, and as a result, two representative character code strings "自滅" and "自恩" are assumed to be accepted as the words. The representative character code subsequent thereto is "豆" or "吉", but if there is no word in the connection of "自恩"-"父家" or "吉"-"自恩" in the category word dictionary for matching, the matching of the category word beginning with "自恩" will not be executed in the later matching process. In the next matching of the fourth character "記", if there is no word in the connection of "吉滅豆"-"記" or "吉"-"記" in the word dictionary for matching, the word candidates beginning with the category "吉" are rejected in the later matching process because there have been no representative character code strings beginning with the category "吉" accepted as a word as the result of matching with the terminal symbol. The process is further continued to carry out matching of the seventh character, and if the character subsequent to the representative character code string "自滅吉 記肋喫" is only the terminal symbol, the representative character code string "自滅吉 記肋喫" is accepted as a word.

The words accepted as the word by the word dictionary for matching and beginning with the first character "自" or "吉" are "自恩" and "自滅吉 記肋喫". Here, by adopting the longest-match principle, only the representative character code string detected as a longer word "自滅吉 記肋喫" is left as the word candidate and outputted. Further, as described above, whether the outputted word can be accepted as a word or not is examined by matching A with the part of speech connection dictionary, and as a result, only the category word strings acceptable as words are outputted.

Thus it becomes possible to extract words with more precision by relating plural similar character categories to one character image. In this way, errors in the pseudo character recognition having been occurred to a certain character in the selection of the category characters by the minimum distance identification caused by the change of the feature of the character by the blurring or distortion of the character image can be minimized by selecting the plural character categories which have similar distances in the feature space.

A second variation of the second embodiment of the document processing apparatus according to the present invention is now described. As described above, in the second embodiment and its first variation, the words acceptable as the particular language can be extracted from the document image without executing detailed identification process for all character types. However, the word has been extracted as a combination of the similar character categories so far; accordingly, there remains indefiniteness, and in some cases plural character words correspond to the representative character code string extracted as one word. For instance, two character words "単語" and "筆記" correspond to the category word "琴記" accepted as a noun. With the above-described construction, the two words "単語" and "筆記" are extracted as the independent words in the document image, and it is impossible to determine which of them is really described in the document image.

To resolve such problem, in the second variation, the feature of each character is examined in detail to uniquely determine a character. In this case, it is unnecessary to execute comparison of features of about approximately 3,000 character types such as in the conventional character recognition, and it is sufficient to execute comparison of the features of the characters used in the character words corresponding to the category words detected in the category word detecting element 106. For example, if the detected category word can be interpreted as three-character words, comparison of the features with three characters may be executed at each character position in the detailed identification process.

Figure 31:
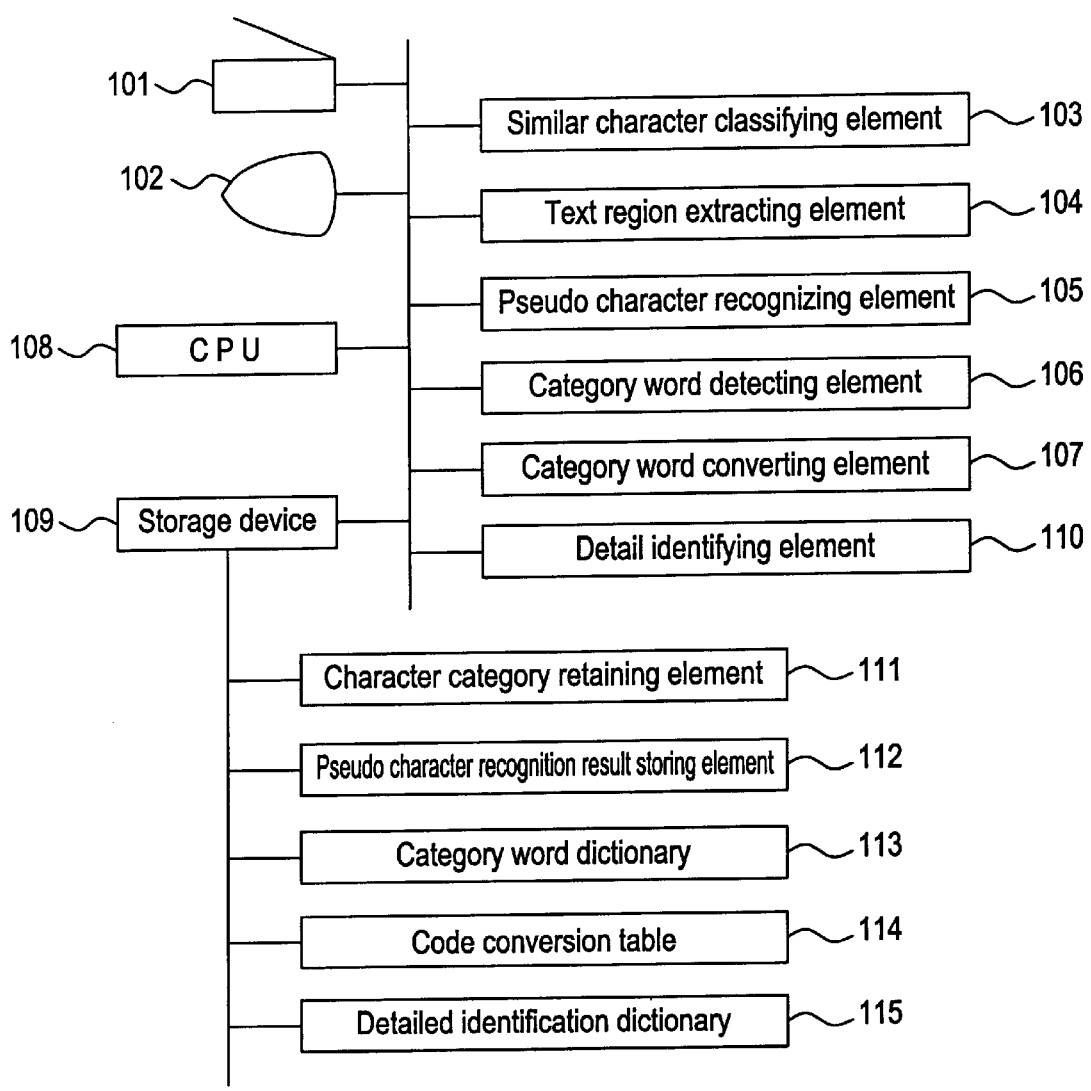
FIG. 31 shows the construction of a second variation of the second embodiment of the document processing apparatus according to the present invention.

FIG. 31 shows the construction of the second variation of the second embodiment of the document processing apparatus according to the present invention. In the figure, elements corresponding to elements in FIG. 21 have the same reference numbers as those in FIG. 21, and the explanations are omitted. A detail identifying element 110 extracts detailed features of inputted unknown character and compares them with the features of the character in the similar character category, and thereby the character type is uniquely determined. A detailed identification dictionary 115 stores detailed features of the character image per every similar character category.

Figure 32A:
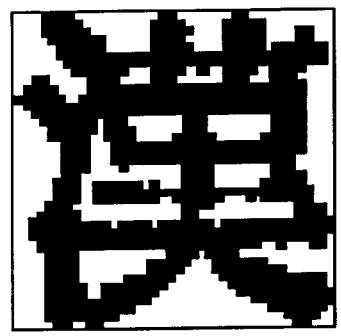
FIGS. 32(A)–32(E) illustrate an example of features used for preparing a detail identification dictionary in the second variation of the second embodiment of the document processing apparatus according to the present invention.
Figure 32B:
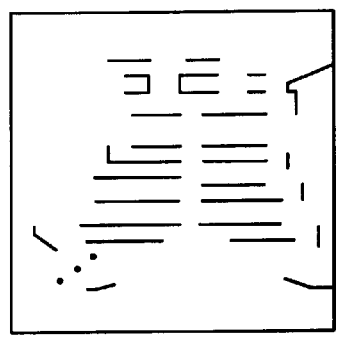
Figure 32C:
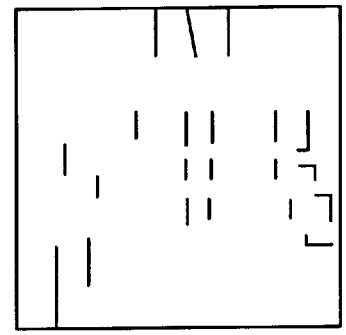
Figure 32D:
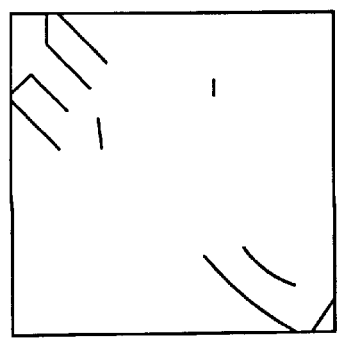
Figure 32E:
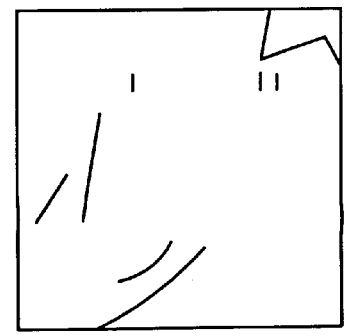

The detail identifying element 110 and the detailed identification dictionary 115 are now explained further. The detailed identification dictionary 115 is generated by utilizing the similar character category table which is the result of classification into similar characters by the similar character classifying element 103. As the features necessary to generate the detailed identification dictionary 115, the features used in the conventional character recognition apparatus can be used. FIGS. 32(A)–(E) illustrate an example of features used for generating the detailed identification dictionary in the second variation of the second embodiment of the document processing apparatus according to the present invention. As the features to be used, for example, the features utilizing a directional attribute disclosed in Japanese Patent Application Laid-Open No. 5-166008 (1993) can be applied. The features are obtained by measuring the continuity of pixels in plural directions regarding outlining pixels in the character image, which represents directions or complexity of lines constituting a character. In the example of FIG. 32(A), the number of pixels indicating the continuity of pixels in each of the directions of left-to-right, top-to-bottom, top-left-to-bottom-right and top-right-to-bottom-left is counted regarding the outlining pixels of the character image "漢", and the direction having the maximum counted value of the number of pixels is determined to be the directional attribute of the pixels. If the outlining pixels having the maximum counted value in the left-to-right direction are collected, the features shown in FIG. 32(B) can be obtained. Similarly, if the outlining pixels having the maximum counted value of the pixels in the top-to-bottom direction are collected, the features shown in FIG. 32(C), in the top-left-to-bottom-right direction, the features shown in FIG. 32(D), and in the top-right-to-bottom-left direction, the features shown in FIG. 32(E) can be obtained respectively. Such features of the directional attribute should be stored in the detailed identification dictionary.

A feature of outline direction contribution degree disclosed in "Handprinted Chinese Characters Recognition by Peripheral Direction Contributivity Feature", Hagita et al., The Transactions of the Institute of Electronics, Information and Communication Engineers D, Vol. J66-D, No. 10, pp. 1185-1192, October, 1983 may be adopted. Being different from the peripheral feature used in the similar character classifying element 103 indicating the shape of the character, each of these features indicates complexity, direction and continuity of lines inside of a character, whereby more detailed features of the character are represented. Of course, other features or a combination of plural kinds of features may be used.

FIG. 33 is a flow chart showing an example of procedures of preparation of the detailed identification dictionary in the second variation of the second embodiment of the document processing apparatus according to the present invention. Here, the feature amount to be used is represented as detailed feature, and is not described as a specific feature amount. First, in step 151, one similar character category is selected from the similar character category table. Next, in step 152, an image representing the character type belonging to the selected similar character category is extracted from the image in the training sample. In step 153, the detailed feature is extracted from each character type in the character image extracted in step 152, and in step 154, an average of the detailed features is calculated. In step 155, grouping of the feature amounts per every similar character category is carried out and the grouped feature amounts are added to the detailed identification dictionary 115. By executing these processes for each similar character category, the detailed identification dictionary is generated.

FIG. 34 illustrates an example of the detailed identification dictionary in the second variation of the second embodiment of the document processing apparatus according to the present invention. The detailed identification dictionary 115 may be constituted, per every similar character category, by the character code belonging thereto and its detailed feature vectors, as shown in FIG. 34, for example. Similar to the similar character category table, character code-category correspondence table, category word dictionary 113 or code conversion table 114, the detailed identification dictionary 115 can also be implemented in another device in advance and constructed so as to use its own data only.

As described above, in the second variation, the category word acceptable as a particular language is extracted from the representative character code string, and finally the character word is obtained by the category word converting element 107. At this time, there are some cases where conversion of one category word into plural character words is possible. In such a case, the details identifying element 110 is called to identify each character image in detail, and thereby a character code is uniquely determined, that is, a character word is determined.

In the details identifying element 110, the character word is determined according to the processes as follows. Now it is assumed that the category word convertible into plural words is Sc and the length of the category word Sc is L(Sc). It is also assumed that the number of character words into which the category word Sc can be converted is N and the n-th word candidate (n≦N) is Swn. The order is assigned to the word candidate, but it has no specific meaning such that a smaller number of candidate has a better possibility to be a word, and it is simply assigned according to the order of the dictionary as a matter of convenience. It is further assumed that i-th character in the character word Swn is represented as Swn(i). Then a character word which makes the value An of the following equation minimum is outputted as an ultimate result of the category converting element 107:

$$An = \sum_{i=0}^{L(Sc)} F(X(i), Swn(i))$$

wherein F (X, M) is the difference between the features of an inputted unknown character X and a certain character M.

As it is understood from the equation, it is actually unnecessary in the details identifying element 110 to carry out comparison of features with those of all character types in each category, and it is sufficient to compare features only with those of the character types in the word candidates having possibilities of the word. Even in the worst case, the number of comparison for one category is the number of similar characters in the category.

The reason why the accumulated value of the difference between the features is used is that it can be considered a word other than the word candidates (in some cases, a word unacceptable as a particular language) is generated influenced by blurring or distortion of character image in the case where the detailed identification of each character image is carried out and a word is generated by combination of characters each of which has the best certainty in the category. The words detected in the category word detecting element 107 are at least accepted as a particular language, and therefore it is possible to make only the word candidates detected in the category word detecting element 107 an object of identification.

Figure 35:
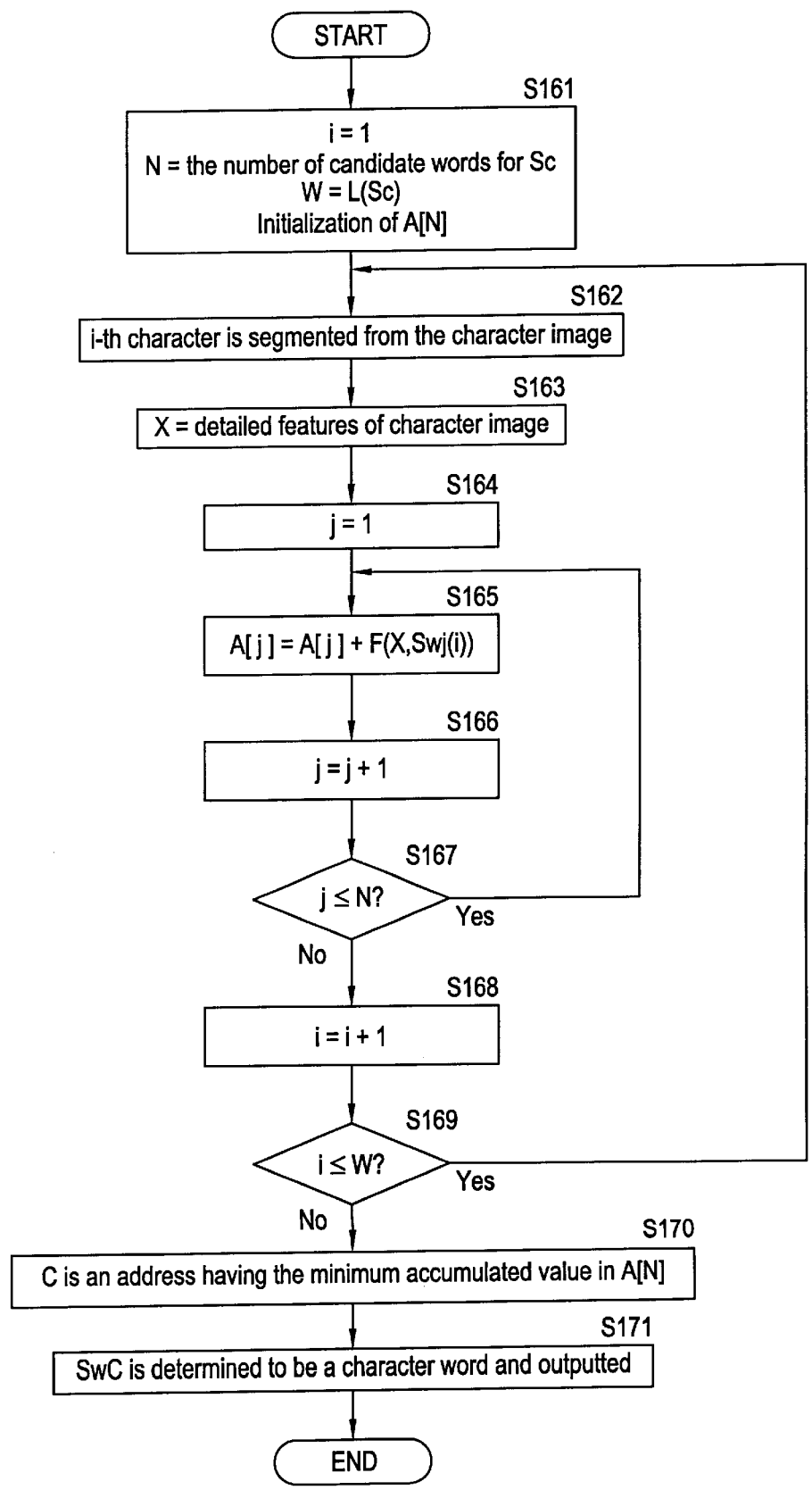
FIG. 35 is a flow chart showing an example of a process of a detail identifying element in the second variation of the second embodiment of the document processing apparatus according to the present invention.

FIG. 35 is a flow chart showing an example of the process in the details identifying element in the second variation of the second embodiment of the document processing apparatus according to the present invention. The example of the process in the details identifying element 110 described above is further explained based on FIG. 35. First, in step 161, a category word Sc to be a processing object is selected and the number of candidates of the character word N corresponding to the category word Sc is counted. The length of the category word Sc, L(Sc) is determined to be W. Moreover, a storage region A [N] used for processing is secured and initialized, and simultaneously, the variable i is set to 1 by initialization. At this point, if the number of candidates of the character word N is 1, the category word is excluded from the processing object and directly converted into the character word by the category word converting element 107. Then the category word Sc determined to be the processing object is segmented in the document image. It is possible to know the position of the processing object category word Sc in the document image by storing the positional information when the category word is segmented by the category word detecting element 106, and referring thereto.

Next, in step 162, the character image of the i-th character is segmented. The position of each character image in the category word can be known by storing the positional information simultaneously when each character image is assigned to the character category in the pseudo character recognizing element 105, and referring thereto. From the character image segmented in this way, the features as same as those used for generating the detailed identification dictionary 115 are extracted in step 163, which is assumed to be the features X. In steps 164–167, the extracted features and the detailed features of the i-th character of each word candidate are compared, and the differences are accumulated in the storage region per every word candidate. That is, in step 164, the variable j is set to 1, and in step 165, the difference F (X, Swj (i) ) between the features X extracted in step 163 and the detailed features Swj (i) of the i-th character is calculated and accumulated in A[j]. In step 166, the variable j is incremented by one. In step 167, it is determined whether the value of the variable j exceeds the number of character word candidates N or not, and the process returns to step 165 to be continued until the value of j exceeds the number N. Thereby the differences of the features of characters from the first one to the i-th one are accumulated in the storage region A[1]–A[N].

Further, in step 168, the variable i is incremented by one. In step 169, the value of the variable i is compared with the length W of the category word, and if i is not more than W, the process returns to step 162 to be continued. In this way, the processes in steps 162–169 are repeated to the last character, and thereby the accumulation value of differences of features of each character is stored in the storage region A[1]–A [N ] per every word candidate.

In step 170, the values of the storage regions A[1]–A[N ] are compared with one another, and an address C of the storage region having the minimum value is obtained. In step 171, the word candidate SwC corresponding to the address C is extracted, and outputted as a character word which has the best certainty.

Here, the example is shown in which the accumulation value of the differences between the features of the unknown characters and those in the dictionary is used as the evaluation function of the word, but it is also possible to obtain the certainty of the unknown characters statistically by utilizing the statistical information such as the distribution of the detailed features of the training sample obtained in generating the dictionary, and make the accumulation of the values the evaluation function of the word.

As described above, if the category word detected in the category word detecting element 107 can be converted into plural character words, precise word extraction is available by executing the detailed identification for the detected category words. Furthermore, it is assured that the words acceptable as a particular language can be detected in the category word detecting element 107 by limiting the object of the detailed identification to the combination of characters of the word candidates.

Next, a third variation of the second embodiment of the document processing apparatus according to the present invention is described. In each of the above examples of the second embodiment, it is assumed that there is no error in the process of character segmentation. However, actually, many errors occur in the process of segmentation as described in the second variation of the first embodiment. In the third variation of the second embodiment, an example coping with such errors occurring in segmentation is shown. As same as the second variation of the first embodiment, the example shown in FIGS. 16(A) and 16(B) is also taken as an example here.

Figure 36:
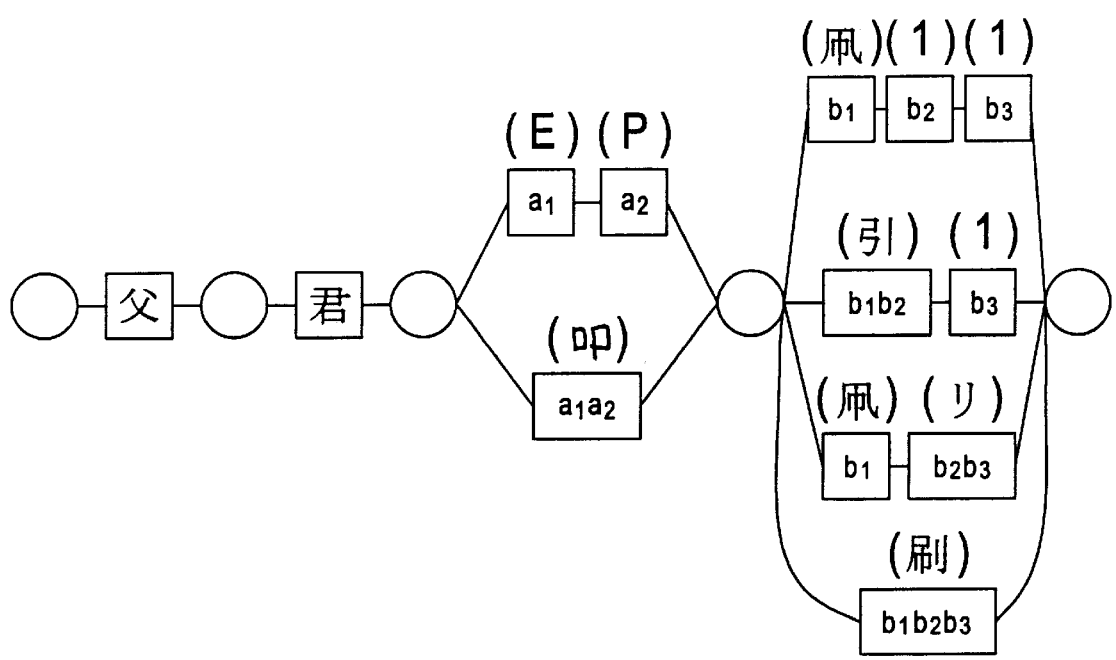
FIG. 36 illustrates an example of relation between segmented character strings in a third variation of the second embodiment of the document processing apparatus according to the present invention.

FIG. 36 illustrates an example of relations between the segmented character strings in the third variation of the second embodiment of the document processing apparatus according to the present invention. As described above, in the case of the example of "文書印刷" shown in FIG. 16(A), there are only the spaces between the characters as to " 文" and " 書". But there is one candidate of segmentation position in the character " 印" only consisting of the white pixels in the vertical direction, and in the character "刷", there are two candidates of such segmentation position. Needless to say, there is a segmentation position between these two characters; consequently, total five partial characters (a1, a2, b1, b2, b3) are obtained. Integration of these partial characters into complete characters is now attempted. Because nothing can be integrated with the characters " 交" and " 書", they are identified with the similar character categories in the pseudo character recognizing element 105 and converted into the representative character codes and " 父" and " 君", respectively. There are two possibilities of interpretation of the character " 印": the partial characters a1 and a2 are dealt with as two characters; and they are regarded as one character. If a2 and b1 are integrated, the threshold value of the width is exceeded; therefore the integration is not executed. Accordingly, two possible preceding interpretations are required to be retained for the same character image region. As a result of similar character identification about each of the interpretations in the pseudo character recognizing element 105, the partial character a1, a2 and partial characters a1a2 are converted into the representative character codes "E", "P" and " 叩", respectively, and stored in the storage device 109. In FIG. 36, the representative character codes are shown in round brackets. The symbols ○ in the figure are pauses of interpretation of character segmentation.

Regarding b1 and the partial characters subsequent thereto, similarly, there are four possible interpretations ([b1], [b2], [b3]), ([b1b2], [b3]), ([b1], [b2b3]) and ([b1b2b3]), wherein the partial characters in the square brackets [ ] are regarded as one character. Therefore, the processes in the pseudo character recognizing element 105 are carried out in the same way. The combinations of partial characters regarded as one character [b1], [b2], [b3], [b1b2], [b2b3] and [b1b2b3] are converted into the representative character codes " 凧", "1", "1", " 引", " リ" and " 刷", respectively, and all of these interpretations are stored in the storage device 109.

The representative character code strings corresponding to " 印刷" obtained as mentioned above are represented "[EP, 叩] [ 凧[11, リ], 1, 刷]" here. The contents in the square brackets [ ] can represent the plural interpretations of segmentation position, if any, within a specific range in the character image. For example, two vertical strokes in the right side of " 刷" can be represented so as to be regarded as one representative character code, as well as two representative character codes.

In the case where there are plural interpretations of segmentation when the category word dictionary 113 is searched, it is examined whether the representative character code string of each range of the interpretations exists in the category word dictionary 113 or not, and all that have possibilities are left. In the above example, regarding the character " 印", it is firstly examined whether the representative character code string "EP" and " 叩" exist in the category word dictionary 113 or not. If both of them are determined to exist, they are retained as those having possibilities of existence. Next, as to the character " 刷", the candidates of the representative character code which follows to each of "EP" and " 叩" are " 凧", " 引" and " 刷", and it is examined whether these candidates are capable of connecting thereto or not by using the category word dictionary 113. Then "EP" is not followed by any of three candidates and becomes a word by itself. The representative character code string " 印刷" exists in the category word dictionary 113 and extracted as a word; accordingly, the candidates of word to follow are similarly attempted to match with it, and further the possibilities of connection are checked by the part of speech connection dictionary. The interpretation "EP" is regarded as one word, and the possibility of connection of the word beginning with the next character is examined. Here, the character categories having the possibility of connection are " 凧", " 引" and " 刷". The words beginning with each of the three categories are extracted and relations of connection in view of part of speech are examined. If there is no such word connecting to "EP", the possibility of interpretation of "EP" is rejected and " 印刷" is left.

As a more complex example, a character string "NMRに おける" is now considered. Here, the characters "N", "M" and "R" are half pitch. Consequently, there is a fear that these adjacent English characters are incorrectly integrated with each other and incorrectly recognized as a Chinese character. Besides, there is a segmentation position in a character "に".

Figure 37:
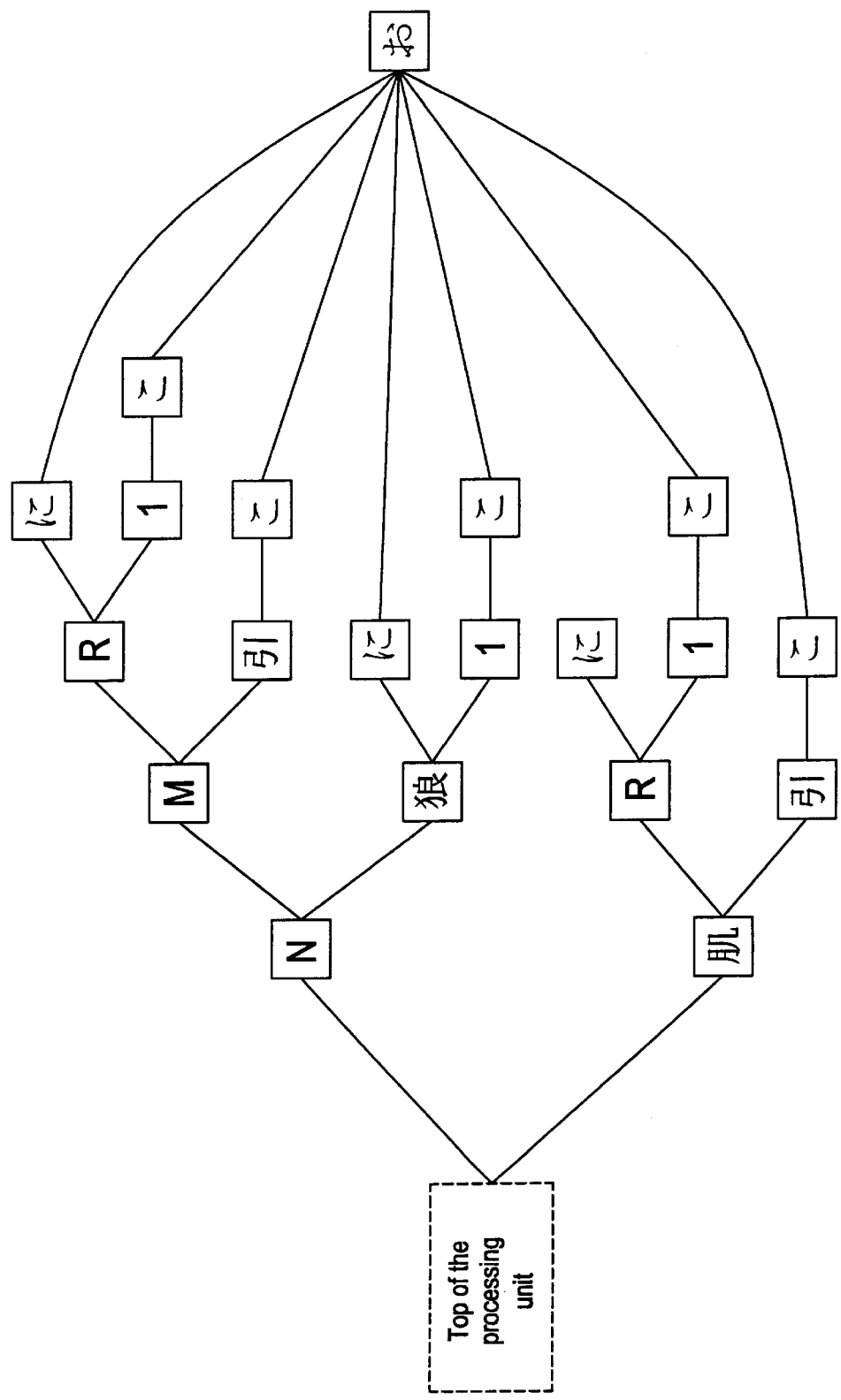
FIG. 37 illustrates another example of relation between the segmented character strings in the third variation of the second embodiment of the document processing apparatus according to the present invention.

FIG. 37 is another example of relations between the segmented character strings in the third variation of the second embodiment of the document processing apparatus according to the present invention. The integration can be assumed as follows: "NM"; "MR" and "R" plus the left side stroke of "に" as one character. It is further assumed that "肌", "狼" and "引" are obtained as the representative character codes corresponding to the three integrated characters. For the character "に", it is assumed that a representative character code "に", and "1" and "こ" for each of separated partial characters are obtained. Then the representative character code strings which permit plural interpretation of character segmentation are represented as [N[M[R に, 引こ], [狼こ1]]], [肌[R[[こ, 1], 引こ]]]. In the case of actual matching, category transition data can be prepared by regarding a representative character code as a node and a connection between representative character codes where transition is possible as an arc based on the plural interpretations of segmentation shown in the square brackets [ ] in the notation of the representative character code strings.

FIG. 37 shows the category transition data which makes part of character string "NMR にお" an object. The matching with the category word dictionary 113 is executed from the top of the category transition data. For example, it is assumed that "NMR" (noun), "肌" (noun) and "肌引" (a stem of a verb) are attempted to be matched as the words in the category word dictionary 113. Possibilities of connection to the subsequent words are checked by the part of speech connection dictionary. For example, if it is turned out that "NMR" can be connected by "に" (postpositional particle assigning the case), the category word "肌" cannot be connected by a word beginning with "R" or "引" and the word "肌引" cannot be connected by a word beginning with the representative character code "こ". Then, as a result, the candidates of the word "肌" and "肌引" are rejected, and "NMR に" still remains as the candidate. Thus the candidate of the correct segmentation position is left.

Figure 38:
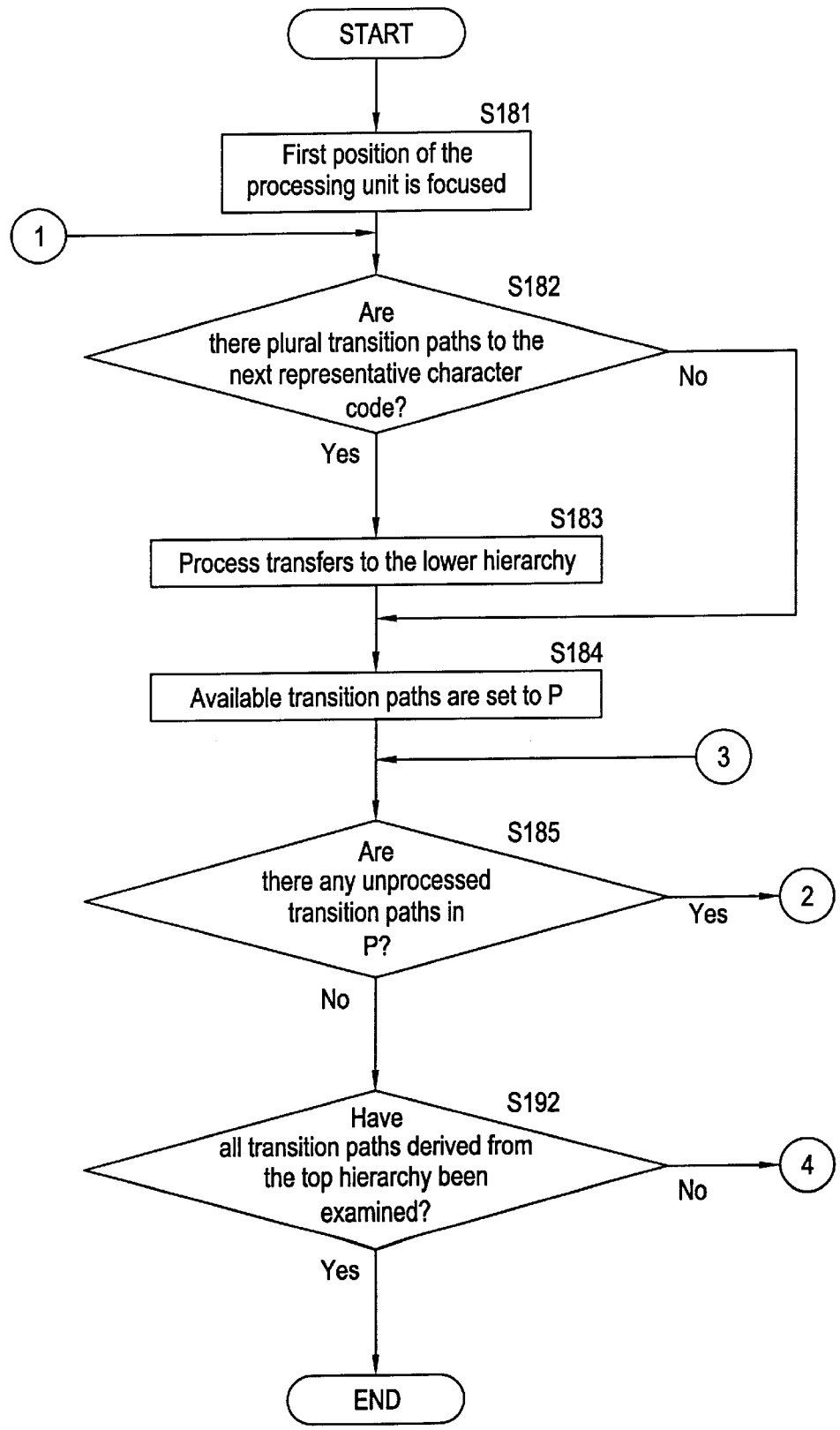
FIGS. 38 and 39 are flow charts showing an example of a process of integrating the segmented character strings in the third variation of the second embodiment of the document processing apparatus according to the present invention.
Figure 39:
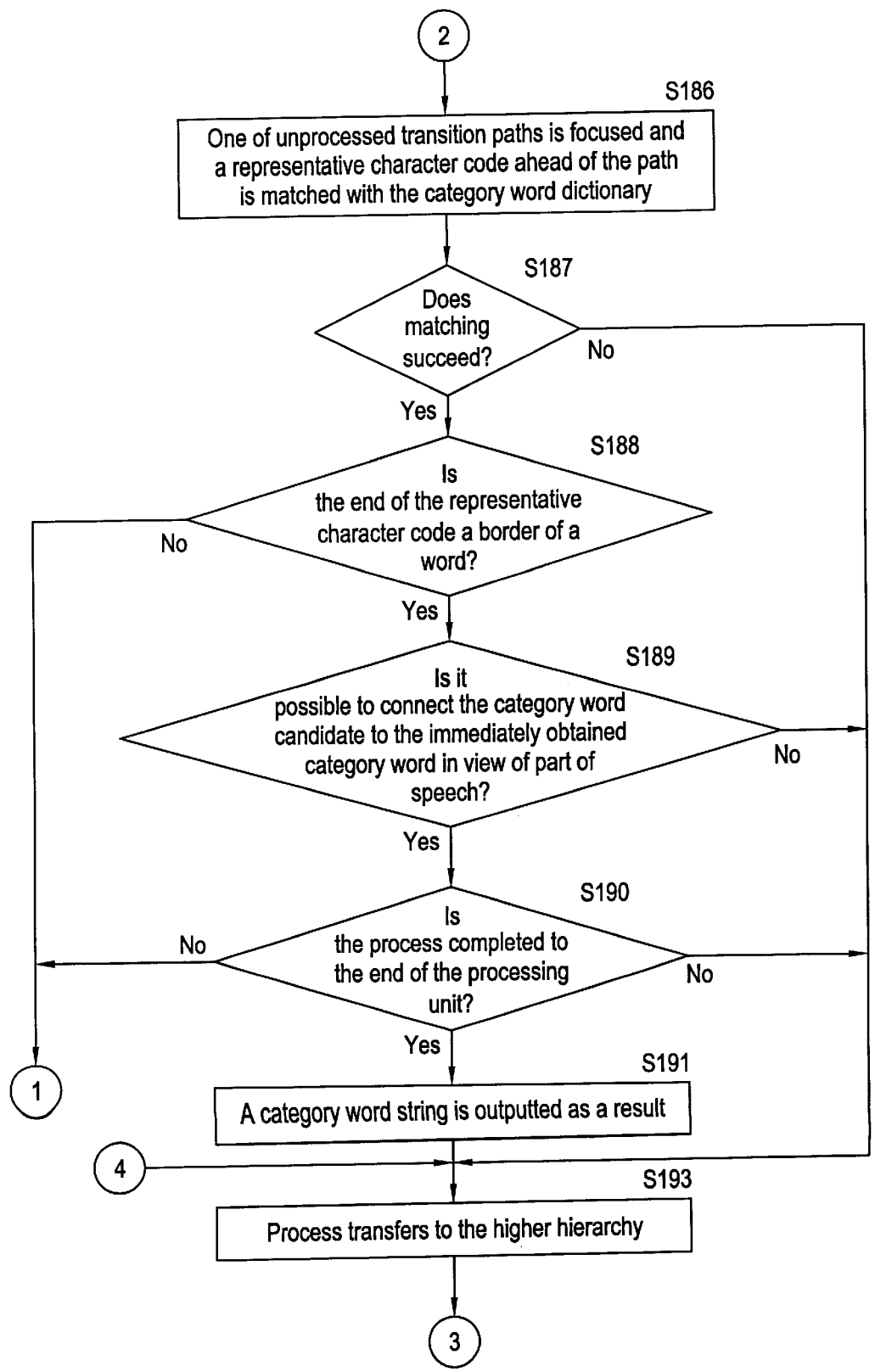

FIGS. 38 and 39 are flow charts showing an example of the integration process of the segmented character strings in the third variation of the second embodiment of the document processing apparatus according to the present invention. At first, a representative character code string which is a processing unit for the process in the pseudo character recognizing element 105 is developed to the category transition data as described above. In step 181, the process is started with the first position of the processing unit as a focused point.

In step 182, it is determined whether there are plural transition paths to the next representative character code or not, and if there are any, the process proceeds to lower hierarchy by one to refer to in step 183. In step 184, available transition paths in the hierarchy currently referred to are set to a variable P.

In step 185, it is determined whether there are unprocessed transition paths in the variable P or not, and if there are any unprocessed transition paths, one of them is focused and the representative character code which is ahead of the transition path is matched with the category word dictionary in step 186. The matching is succeeded or not is determined in step 187. If it is determined to be succeeded, whether the end of the representative character code is the border of a word or not is further determined in step 188. If it is not the border of a word, the process returns to step 182 and matching with the category word dictionary is continued until a word can be extracted. If the matching up to the border of a word is succeeded, and thereby a candidate of the category word is obtained, relation of connection regarding part of speech to the category word candidate immediately obtained is examined to determine whether it is possible to connect with each other in step 189. If possible, it is left. In step 190, whether process completes to the end of the processing unit is determined in step 190, and if the process is still in the course of the processing unit, the process returns to step 182 to extract the next category word and the process is continued. If the process is completed to the end of the processing unit, the string of the category words obtained so far can be a candidate of a word; therefore the obtained category word string is outputted in step 191.

If it is determined in step 187 that the matching with the category word dictionary in step 186 failed, the process returns to the hierarchy higher by one layer than before for reference, where plural interpretations exist, and matching with other paths from step 185 are also executed. In the case where it is determined in step 189 that connection of parts of speech is not permitted, also, possibilities of the word strings supposed hitherto are rejected and the transitions subsequent thereto are excluded from the object of processing, and thereby processes are not carried out. Then, in step 193, the process returns to the hierarchy higher by one layer than before, where plural interpretations exist, and processes from step 185 are continued in the same way. Furthermore, even after the processes are completed to the end of the processing unit and the category word string is outputted in step 191, the process proceeds to step 193 for determination of other possibilities, in which the process returns to the hierarchy higher by one layer than before where plural interpretations exist, and the process proceeds to step 185 and is continued. If another possible category word string is obtained, it is also outputted in step 191, of course.

If there remains no unprocessed transition path in the variable P in step 185, it is determined in step 192 whether all transitions derived from the top of the hierarchy are examined or not. If there is any transition which is unexamined, the process proceeds to step 193 to make the hierarchy higher by one layer than before where plural interpretations exist, and in step 185, unprocessed transition path is sought and the process is continued. If the processes for all transitions from the top hierarchy are completed, it means that the processes for all paths in the category transition data provided to one processing unit are completed. Thus the integration process is finished.

As described so far, though in the case there are divided characters and plural category word candidates are found, it is possible to gradually reduce the possibilities of the words in view of the relation of connection of parts of speech, and thereby word extraction with high speed and with high precision becomes available.

Each of the above-described embodiments can also be implemented by a computer program. In such a case, it is possible to store the program, a dictionary used by the program, table or the like in a storage medium readable by the computer. The storage medium is able to communicate the contents described in the computer, which is in a form of a signal corresponding to the condition of transformation of energy of magnetism, optics, electricity or the like caused in accordance with the contents described in the computer, to a reading device equipped with hardware resources of the computer. The storage medium may be, for example, a magnetic disk, optical disk, CD-ROM, or a memory built-in the computer.

As it is clear from the above description, according to the present invention, full-text retrieval can be realized by only classifying the characters in the document image into the small number of similar character categories without identifying those characters with the character code strings. The identification of the similar character categories in the present invention is executed by adopting feature vectors of the number of dimensions far less than those of conventional character recognition. Therefore, since it is sufficient only to identify the characters with the small number of similar character categories, it is possible to greatly accelerate the speed in extraction of the independent words which can be used as the keywords from the document image and registration of the document image.

The similar character categories are retained as an attribute of the original document image, and when the retrieval is to be executed, each of the characters of the retrieval keyword is converted into the string of the similar characters to be used for retrieval. Because plural characters belong to a similar character category, there is a possibility that character strings corresponding to the representative character code strings converted from the keyword include those other than the desirable keyword. However, if it is taken into consideration that the retrieval keyword normally consists of plural characters and moreover, plural keywords are specified, there are actually a few cases where character stings other than the desirable keyword are obtained as a result. In contrast, the precision of classification into similar character categories is extremely high in comparison with the number of errors in character recognition in the document image, and consequently, the retrieval can be carried out with little oversight. Furthermore, since the method of ordinary full-text search can be used without changing, there is an advantage of executing processes as same as those of ordinary electronic document retrieval.

Moreover, by extracting a word from the similar character category strings with referring to the category word dictionary, possibility of retrieving meaningless character strings can be reduced, and further the precision of retrieval can be improved by taking the possibility of connection between the words in view of part of speech into consideration. In some cases, plural different words are represented by the same similar character category string, but in such cases, it may be determined which character in the category should be adopted by more detailed identification. After the category words are extracted, if some words corresponding to at least a part of the extracted category words are made to be the keywords, it is unnecessary to execute a specific process on the retrieval keywords, and accordingly the keyword retrieval used in the ordinary database is available. That is, there is an advantage that the data of the electronic document and the document image can be treated equally.

The foregoing description of preferred embodiments of this invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A document processing apparatus for processing Asian language text comprising:

character category storing means for storing a category of similar character made by classification of characters based on an image feature of each character with relation to the image feature;

text region extracting means for segmenting an image of every character in said Asian language text of an inputted document image;

pseudo character recognizing means for classifying the image of every character segmented by said text region extracting means into the category stored in said character category storing means based on the image feature related to the category;

pseudo character recognition result storing means for storing the category into which the image of every character is classified by the pseudo character recognizing means with relation to the inputted document image;

keyword converting means for converting each character in a retrieval expression inputted for retrieval into the nearest category stored in said character category storing means; and document retrieving means for retrieving a document image having a category matching the category generated by converting the retrieval expression by said keyword converting means from said pseudo character recognition result storing means.

2. The document processing apparatus according to claim 1, wherein the category stored in said character category storing means is generated by classification of characters by clustering feature vectors of a character image.

3. The document processing apparatus according to claim 1, wherein the category stored with relation to the document image in said pseudo character recognition result storing means is stored as a bi-gram table storing an identifier of a document including a key which is a category of two adjacent character images in the document image, and said document retrieving means retrieves the category converted by said keyword converting means from the bi-gram table.

4. The document processing apparatus according to claim 1, wherein said character category storing means classifies one character into plural categories in some cases, and said keyword converting means converts one retrieval keyword into all categories stored in said character category storing means.

5. The document processing apparatus according to claim 1, wherein said character category storing means classifies one character into plural categories in some cases, and stores a probability of classification of the character into each category in such cases, and said document retrieving means retrieves a document image from said pseudo character recognition result storing means in accordance with the probability stored in said character category storing means.

6. The document processing apparatus according to claim 1, wherein, if there is a plurality of interpretations of character segmentation, said text region extracting means executes segmentation for all interpretations; said pseudo character recognizing means classifies the all results of segmentation executed by said text region extracting means into categories; and said pseudo character recognition result storing means stores all categories classified by said pseudo character recognizing means with relation to the document image.

7. A document processing method for processing Asian language text used in a document processing apparatus having character category storing means for storing a category of similar character made by classification of characters based on an image feature of each character with relation to the image feature, comprising the steps of:

segmenting an image of each character in said Asian language text of an inputted document image;

classifying the segmented image of every character into the category stored in said character category storing means based on the image related to the category;

storing the category into which the image of every character is classified with relation to the inputted document image;

converting each character in a retrieval expression inputted for retrieval into the nearest category stored in said character category storing means; and retrieving a document image having a category satisfying the retrieval expression which has been converted into the category.

8. A storage medium having a computer readable program and a dictionary for use with a computer, said dictionary being a character category dictionary storing a category of a similar character made by classification of a character based on an image feature of each character in an Asian language text, said computer readable program comprising:

program code means for causing said computer to execute a text region extraction process of segmenting an image of every character in said Asian language text of an inputted document image;

program code means for causing said computer to execute a pseudo character recognizing process of classifying the segmented image of every character segmented by the text region extracting process into the category stored in said character category dictionary based on the image feature related to the category;

program code means for causing said computer to execute a pseudo character recognition result storing process of storing the category into which the image of every character is classified by the pseudo character recognizing process with relation to the inputted document image;

program code means for causing said computer to execute a keyword converting process of converting each character in a retrieval expression inputted for retrieval into the nearest category stored in said character category dictionary; and program code means for causing said computer to execute a document retrieving process of retrieving a document image having a category satisfying the retrieval expression which has been converted into the category from the document images stored by the pseudo character recognition result storing process with relation to the category.

* * * * *